(12) United States Patent
Park et al.

(10) Patent No.: US 10,575,012 B2
(45) Date of Patent: *Feb. 25, 2020

(54) METHOD FOR SELECTING MOTION VECTOR PREDICTOR AND DEVICE USING SAME

(71) Applicant: LG Electronics Inc., Seoul (KR)

(72) Inventors: Joon Young Park, Gwangmyeong-si (KR); Seung Wook Park, Gwacheon-si (KR); Jae Hyun Lim, Anyang-si (KR); Jung Sun Kim, Seoul (KR); Young Hee Choi, Seoul (KR); Byeong Moon Jeon, Seoul (KR); Yong Joon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

This patent is subject to a terminal disclaimer.

(21) Appl. No.: 15/900,081

(22) Filed: Feb. 20, 2018

(65) Prior Publication Data

US 2018/0176593 A1 Jun. 21, 2018

Related U.S. Application Data

(63) Continuation of application No. 15/393,716, filed on Dec. 29, 2016, now Pat. No. 9,936,221, which is a
(Continued)

(51) Int. Cl.
*H04N 19/56* (2014.01)
*H04N 19/52* (2014.01)
(Continued)

(52) U.S. Cl.
CPC ........... *H04N 19/56* (2014.11); *H04N 19/107* (2014.11); *H04N 19/117* (2014.11);
(Continued)

(58) Field of Classification Search
CPC .... H04N 19/159; H04N 19/176; H04N 19/52; H04N 19/61; H04N 19/105; H04N 19/56;
(Continued)

(56) References Cited

U.S. PATENT DOCUMENTS 6,895,361 B2    5/2005   Yang
7,321,626 B2    1/2008   Sun
(Continued)

FOREIGN PATENT DOCUMENTS

EP    1 339 223 A2    8/2003
EP    1 503 559 A2    2/2005
(Continued)

OTHER PUBLICATIONS

Jung, J., et al., "Competition-Based Scheme for Motion Vector Selection and Coding," ITU—Telecommunications Standardization Sector, Study Group 16 Question 6, Video Coding Experts Group (VCEG), 29th Meeting: Klagenfurt, Austria, Jul. 17-18, 2006, 8 pages.
(Continued)

*Primary Examiner* — Tung T Vo
(74) *Attorney, Agent, or Firm* — Dentons US LLP

(57) ABSTRACT

A method for selecting a motion vector predictor is provided. The method of selecting a motion vector predictor includes the steps of selecting motion vector predictor candidates for a current block and selecting a motion vector predictor of the current block out of the motion vector predictor candidates, wherein the motion vector predictor candidates for the current block include a motion vector of a first candidate block which is first searched for as an available block out of left neighboring blocks of the current block and a motion vector of a second candidate block which is first searched for as an available block out of upper neighboring blocks of the current block.

14 Claims, 10 Drawing Sheets

Related U.S. Application Data continuation of application No. 15/065,048, filed on Mar. 9, 2016, now Pat. No. 9,667,992, which is a continuation of application No. 14/673,029, filed on Mar. 30, 2015, now Pat. No. 9,319,709, which is a continuation of application No. 14/006,336, filed as application No. PCT/KR2012/001999 on Mar. 21, 2012, now Pat. No. 9,374,598.

(60) Provisional application No. 61/466,446, filed on Mar. 22, 2011, provisional application No. 61/454,995, filed on Mar. 21, 2011.

(51) Int. Cl.
| | |
|---|---|
| *H04N 19/513* | (2014.01) |
| *H04N 19/107* | (2014.01) |
| *H04N 19/117* | (2014.01) |
| *H04N 19/124* | (2014.01) |
| *H04N 19/139* | (2014.01) |
| *H04N 19/176* | (2014.01) |
| *H04N 19/44* | (2014.01) |
| *H04N 19/61* | (2014.01) |

(52) U.S. Cl.
CPC ......... *H04N 19/124* (2014.11); *H04N 19/139* (2014.11); *H04N 19/176* (2014.11); *H04N 19/44* (2014.11); *H04N 19/513* (2014.11); *H04N 19/52* (2014.11); *H04N 19/521* (2014.11); *H04N 19/61* (2014.11)

(58) Field of Classification Search
CPC .... H04N 19/44; H04N 19/139; H04N 19/124; H04N 19/117; H04N 19/107; H04N 19/513; H04N 19/521; H04N 19/50; H04N 19/182; H04N 19/13
USPC .................................................... 375/240.16
See application file for complete search history.

(56) References Cited

U.S. PATENT DOCUMENTS

| | | | |
|---|---|---|---|
| 7,680,186 B2 | 3/2010 | Lee et al. | |
| 8,824,558 B2 | 9/2014 | Lin et al. | |
| 8,995,529 B2 | 3/2015 | Lee et al. | |
| 9,060,176 B2 | 6/2015 | Bossen et al. | |
| 2003/0163281 A1 | 8/2003 | Yang | |
| 2003/0202586 A1 | 10/2003 | Jeon | |
| 2004/0057520 A1 | 3/2004 | Sun | |
| 2005/0025244 A1 | 2/2005 | Lee et al. | |
| 2005/0259736 A1 | 11/2005 | Payson | |
| 2006/0013299 A1* | 1/2006 | Sato | H04N 19/159 375/240.03 |
| 2006/0291556 A1* | 12/2006 | Watanabe | H04N 19/176 375/240.03 |
| 2008/0043842 A1* | 2/2008 | Nakaishi | H04N 19/119 375/240.16 |
| 2009/0304084 A1 | 12/2009 | Hallapuro et al. | |
| 2011/0080954 A1 | 4/2011 | Bossen et al. | |
| 2012/0008688 A1 | 1/2012 | Tsai et al. | |
| 2012/0027089 A1 | 2/2012 | Chien et al. | |
| 2012/0082236 A1* | 4/2012 | Haskell | H04N 7/26888 375/240.24 |
| 2012/0087411 A1* | 4/2012 | Haskell | H04N 19/61 375/240.16 |
| 2012/0128060 A1 | 5/2012 | Lin et al. | |
| 2012/0155533 A1* | 6/2012 | Puri | H04N 19/176 375/240.02 |
| 2012/0275522 A1* | 11/2012 | Kim | H04N 19/52 375/240.16 |
| 2012/0307905 A1* | 12/2012 | Kim | H04N 19/52 375/240.16 |
| 2013/0101040 A1 | 4/2013 | Francois et al. | |
| 2013/0229485 A1 | 9/2013 | Rusanovskyy et al. | |
| 2013/0294517 A1 | 11/2013 | Fujibayashi et al. | |
| 2013/0315311 A1* | 11/2013 | Song | H04N 19/105 375/240.16 |
| 2014/0049605 A1 | 2/2014 | Chen et al. | |
| 2014/0086325 A1 | 3/2014 | Chen et al. | |
| 2014/0161186 A1 | 6/2014 | Zhang et al. | |
| 2014/0205014 A1 | 7/2014 | Nakamura et al. | |
| 2014/0219356 A1 | 8/2014 | Nishitani et al. | |
| 2015/0016531 A1 | 1/2015 | Hannuksela | |
| 2015/0049808 A1 | 2/2015 | Jeon | |
| 2015/0049809 A1 | 2/2015 | Jeon | |
| 2015/0049810 A1 | 2/2015 | Jeon | |
| 2015/0049811 A1 | 2/2015 | Jeon | |
| 2015/0049816 A1 | 2/2015 | Lee et al. | |
| 2015/0071358 A1 | 3/2015 | Lee et al. | |
| 2015/0103927 A1 | 4/2015 | Hannuksela | |

FOREIGN PATENT DOCUMENTS

| | | |
|---|---|---|
| JP | 2004-056756 A | 2/2004 |
| JP | 2004-208258 A | 7/2004 |
| JP | 2004-336369 A | 11/2004 |
| JP | 2004-096705 A1 | 7/2006 |
| JP | 2015-208033 A | 11/2015 |
| JP | 6073979 B2 | 2/2017 |
| KR | 10-2000-021856 A | 4/2000 |
| KR | 10-2003-070278 A | 8/2003 |
| KR | 10-2005-013847 A | 2/2005 |
| WO | 2012005549 A2 | 1/2012 |
| WO | 12/023763 A2 | 2/2012 |
| WO | 2012093585 A1 | 7/2012 |

OTHER PUBLICATIONS

Zhou, Minhua, "Joint Collaborative Team on Video Coding (JCT-VC) of ITU-T SG16 WP3 and ISO/IEC JTC/SC29/WG11," 5th Meeting, Geneva, CH, Mar. 2011, 4 pages.
XP030008135: Joint Collaborative Team on Video Coding (JCT-VC), Joonyoung Park, Seungwook Park, etc. "Improvement on median motion vectors of AMVP", 4th Meeting: Daegu, KR, Jan. 20-28, 2011.
XP030008856: Joint Collaborative Team on Video Coding (JCT-VC), Joonyoung Park, Seungwook Park, etc. "CE9 Subtests N and O: Improvement on AMVP", 5th Meeting: Geneva, Mar. 16-23, 2011.
XP030008165: Joint Coiiaborative Team on Video Coding (JCT-VC), Jian-Liang Lin, Yu-Pao Tsai, "Improved Advanced Motion Vector Prediction" 4th Meeting: Daegu, KR, Jan. 20-28, 2011.
McCann (Zetacasts/Samsung) K., et al., "Samsung's Response to the Call for Proposals on Video Compression Technology", Joint Collaborative Team on Video Coding (JCT-VC) of ITU-T SG16 WP3 and ISO/IEC JTC 1/SC29/WG11, 1st Meeting: Dresden, DE, Apr. 15-23, 2010, XP030007573, 42 pages.
Supplementary European Search Report dated Sep. 24, 2014 from corresponding European Application No. 12760302.5, 8 pages.
Frank Bossen et al., "Simplified Motion Vector Coding Method", Joint Collaborative Team on Video Coding (JCT-VC), of ITU-T SG16 WP3 and ISO/IEC JTC 1/SC29/WG11, 2nd Meeting: Geneva, CH Jul. 21-28, 2010, JCTVC-B094, 5 pages.
Akira Fujibayashi, "CE9 3.2d Simplified Motion Vector Coding Method", Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D231, 5 pages.
Yusuki Itani et al. "Improvements to AMVP/Merge Process", Joint Collaborative Team on Video Coding (JCT-VC) of ITU-T SG16 WP3 and ISO/IEC JTC1/SC29/WG11, 5th Meeting: Geneva, CH, Mar. 16-23, 2011, JCTVC-3064, 8 pages.
International Search Report dated Oct. 10, 2012 for Application No. PCT/KR2012/001999, with English Translation, 4 pages.
JCT-VC "Test Model under Construction", Joint Collaborative Team on Video Coding (JCT-VC) of ITU-T SG16 WP3 and ISO/IEC JTC1/SC29/WG11, 2nd Meeting: Geneva, CH, Jul. 21-28, 2010, Document JCTVC-B205.

(56) References Cited

OTHER PUBLICATIONS

MediaTek Inc.: "Improved Advanced Motion Vector Prediction", Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document JCTVC-D125.

* cited by examiner

METHOD FOR SELECTING MOTION VECTOR PREDICTOR AND DEVICE USING SAME

This application is a Continuation of application Ser. No. 15/393,716, filed Dec. 29, 2016, which is a Continuation of application Ser. No. 15/065,048, filed on Mar. 9, 2016, which is a Continuation of application Ser. No. 14/673,029 filed on Mar. 30, 2015, which is a Continuation of application Ser. No. 14/006,336 filed on Oct. 3, 2013, which is a U.S. National Phase Application under 35 U.S.C. § 371 of International Application PCT/KR2012/001999, filed on Mar. 21, 2012, which claims the benefit of U.S. Provisional Application No. 61/454,995, filed on Mar. 21, 2011 and U.S. Provisional Application No. 61/466,446, filed on Mar. 22, 2011, the entire contents of which are hereby incorporated by reference in their entireties.

TECHNICAL FIELD

The present invention relates to a video (moving picture) compressing technique, and more particularly, to a method of predicting information of a current block using information of neighboring blocks thereof.

BACKGROUND ART

In recent years, demands for a high-resolution and high-quality image have increased in various fields of applications. As an image has a higher resolution and higher quality, an amount of data on the image increases more and more. Accordingly, when video data is transferred using media such as existing wired or wireless broadband lines or video data is stored in existing storage media, the transfer cost and the storage cost of data increase.

In order to effectively transfer, store, and reproduce information on high-resolution and high-quality video, high-efficiency video compressing techniques can be utilized.

In order to enhance video compression efficiency, a method of predicting information of a current block using information of neighboring blocks of the current block without transferring the information of the current block can be used.

Inter prediction and intra prediction can be used as the prediction method.

In the inter prediction, pixel values of a current picture are predicted with reference to information of other pictures. In the intra prediction, pixel values of a current picture are predicted using inter-pixel relationships in the same picture.

When the inter prediction is performed, information indicating a reference picture and information indicating a motion vector from the neighboring blocks in an inter prediction mode can be utilized to designate a part of another picture to be used for the prediction.

SUMMARY OF THE INVENTION

Technical Problem

An object of the invention is to provide a prediction method which can enhance compression efficiency and reduce an amount of data to be transmitted and which can reduce complexity in the course of encoding/decoding a video (moving picture) and a device using the prediction method.

Another object of the invention is to provide a method of scanning neighboring blocks so as to construct motion information predictor candidates of a current block effectively using neighboring information and a device using the scanning method.

Another object of the invention is to provide a method of scaling motion information so as to use motion information acquired from neighboring blocks as a motion information predictor candidate of a current block and a device using the scaling method.

Solution to Problem (1) According to an aspect of the invention, there is provided a method of selecting a motion vector predictor, including the steps of: selecting motion vector predictor candidates for a current block; and selecting a motion vector predictor of the current block out of the motion vector predictor candidates, wherein the motion vector predictor candidates for the current block include a motion vector of a first candidate block which is first searched for as an available block out of left neighboring blocks of the current block and a motion vector of a second candidate block which is first searched for as an available block out of upper neighboring blocks of the current block.

(2) In the method of selecting a motion vector predictor according to (1), the available block may be a block which satisfies any one of a first condition that a block has a reference picture identical to that of the current block and a reference picture list identical to that of the current block, a second condition that a block has a reference picture identical to that of the current block and a reference picture list different from that of the current block, a third condition that a block has a reference picture different from that of the current block and a reference picture list identical to that of the current block, and a fourth condition that a block has a reference picture different from that of the current block and a reference picture list different from that of the current block, and may be a block to which an inter prediction mode is applied.

(3) In the method of selecting a motion vector predictor according to (2), the step of selecting a motion vector predictor of the current block may include searching for the motion vector predictor with a higher priority given to an earlier number of the first to fourth conditions.

(4) In the method of selecting a motion vector predictor according to (2), the motion vector of the first candidate block or the second candidate block satisfying the third condition or the fourth condition may be scaled.

(5) In the method of selecting a motion vector predictor according to (4), the scaling may be carried out on the basis of a distance between a current picture to which the current block belongs and a reference picture of the current block and a distance between the current picture and a reference picture of the first candidate block or the second candidate block satisfying the third condition or the fourth condition.

(6) In the method of selecting a motion vector predictor according to (4), the number of times of scaling may be limited to a predetermined number of times.

(7) In the method of selecting a motion vector predictor according to (1), the left neighboring blocks may include a first neighboring block located at the left-bottom corner of the current block and a second neighboring block located on the left-bottom side of the current block.

(8) In the method of selecting a motion vector predictor according to (7), the step of selecting motion vector predictor candidates of the current block may include: a condition determining step of determining whether the first neighboring block and the second neighboring block satisfy any one of a first condition that a block has a reference picture identical to that of the current block and a reference picture list identical to that of the current block, a second condition that a block has a reference picture identical to that of the current block and a reference picture list different from that of the current block, a third condition that a block has a reference picture different from that of the current block and a reference picture list identical to that of the current block, and a fourth condition that a block has a reference picture different from that of the current block and a reference picture list different from that of the current block in the order of the first to fourth conditions; and a candidate block determining step of determining a block which is first searched for to satisfy any one of the first to fourth conditions as the first candidate block.

(9) In the method of selecting a motion vector predictor according to (8), the condition determining step may include the steps of: determining whether the first neighboring block satisfies the first condition and the second condition; determining whether the second neighboring block satisfies the first condition and the second condition; determining whether the first neighboring block satisfies the third condition and the fourth condition; and determining whether the second neighboring block satisfies the third condition and the fourth condition.

(10) In the method of selecting a motion vector predictor according to (1), the upper neighboring blocks may include a third neighboring block located at the upper-right corner of the current block, a fourth neighboring block located on the upper-right side of the current block, and a fifth neighboring block located at the left-upper corner of the current block.

(11) In the method of selecting a motion vector predictor according to (10), the step of selecting motion vector predictor candidates of the current block may include: a condition determining step of determining whether the third neighboring block, the fourth neighboring block, and the fifth neighboring block satisfy any one of a first condition that a block has a reference picture identical to that of the current block and a reference picture list identical to that of the current block, a second condition that a block has a reference picture identical to that of the current block and a reference picture list different from that of the current block, a third condition that a block has a reference picture different from that of the current block and a reference picture list identical to that of the current block, and a fourth condition that a block has a reference picture different from that of the current block and a reference picture list different from that of the current block in the order of the first to fourth conditions; and a candidate block determining step of determining a block which is first searched for to satisfy any one of the first to fourth conditions as the second candidate block.

(12) In the method of selecting a motion vector predictor according to (11), the condition determining step may include the steps of: determining whether the third neighboring block satisfies the first condition and the second condition; determining whether the fourth neighboring block satisfies the first condition and the second condition; determining whether the fifth neighboring block satisfies the first condition and the second condition; determining whether the third neighboring block satisfies the third condition and the fourth condition; determining whether the fourth neighboring block satisfies the third condition and the fourth condition; and determining whether the fifth neighboring block satisfies the third condition and the fourth condition.

(13) According to another aspect of the invention, there is provided a decoding device including: a prediction module that performs prediction on a current block; and a memory that stores information on neighboring blocks of the current block, wherein the prediction module selects motion vector predictor candidates for the current block and selects a motion vector predictor of the current block out of the motion vector predictor candidates, and wherein the motion vector predictor candidates for the current block include a motion vector of a first candidate block which is first searched for as an available block out of left neighboring blocks of the current block and a motion vector of a second candidate block which is first searched for as an available block out of upper neighboring blocks of the current block.

(14) In the decoding device according to (13), the available block may be a block which satisfies any one of a first condition that a block has a reference picture identical to that of the current block and a reference picture list identical to that of the current block, a second condition that a block has a reference picture identical to that of the current block and a reference picture list different from that of the current block, a third condition that a block has a reference picture different from that of the current block and a reference picture list identical to that of the current block, and a fourth condition that a block has a reference picture different from that of the current block and a reference picture list different from that of the current block, and may be a block to which an inter prediction mode is applied, and the prediction module may search for the motion vector predictor with a higher priority given to an earlier number of the first to fourth conditions.

(15) In the decoding device according to (14), the prediction module may scale the motion vector of the first candidate block or the second candidate block satisfying the third condition or the fourth condition.

Advantageous Effects

According to the prediction method provided by the invention, it is possible to enhance compression efficiency, to reduce an amount of data to be transmitted, and to reduce complexity in the course of encoding/decoding a video (moving picture).

According to the prediction method provided by the invention, it is possible to derive motion information predictor candidates of a current block effectively using neighboring blocks' information.

According to the prediction method provided by the invention, it is possible to scale motion information acquired from neighboring blocks and to use the scaled motion information as a motion information predictor candidate of a current block.

DESCRIPTION OF EXEMPLARY EMBODIMENTS

Figure 1:
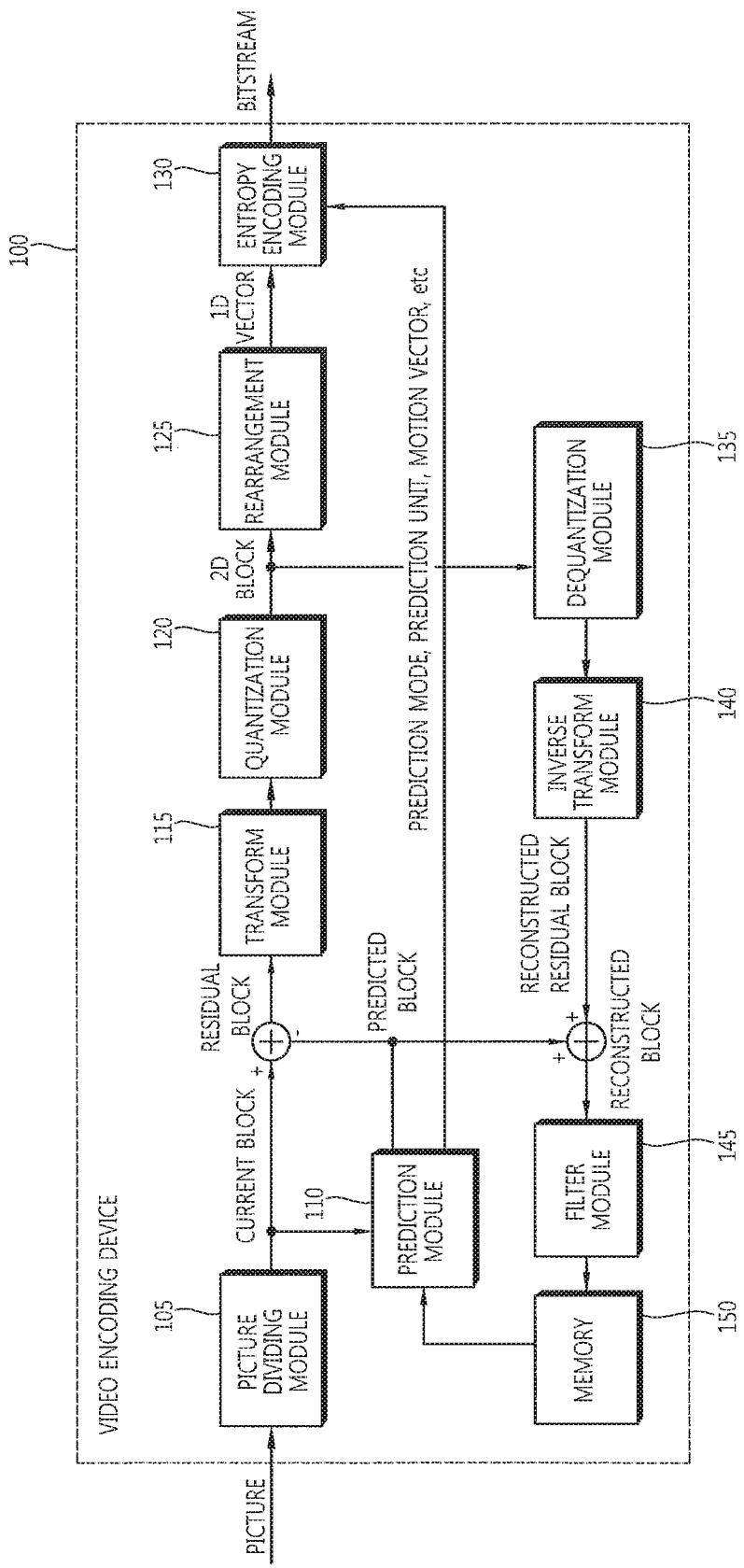
FIG. 1 is a block diagram schematically illustrating a video encoding device (encoder) according to an embodiment of the invention.

The invention can be variously modified in various forms and can have various embodiments, and specific embodiments thereof will be described in detail and shown in the drawings. However, the embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" are intended to indicate that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in a video encoding/decoding device and does not mean that the elements are embodied by independent hardware or independent software. For example, two or more elements out of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings.

FIG. 1 is a block diagram schematically illustrating a video encoding device (encoder) according to an embodiment of the invention. Referring to FIG. 1, a video encoding device 100 includes a picture dividing module 105, a prediction module 110, a transform module 115, a quantization module 120, a rearrangement module 125, an entropy encoding module 130, an inverse quantization module 135, an inverse transform module 140, a filter module 145, and a memory 150.

The picture dividing module 105 may divide an input picture into at least one process unit. Here, the process unit may be a prediction unit (hereinafter, referred to as a "PU"), a transform unit (hereinafter, referred to as a "TU"), or a coding unit (hereinafter, referred to as a "CU"). In this specification, for the purpose of convenience for explanation, a prediction unit may be expressed by a prediction block, a transform unit may be expressed by a transform block, and a coding unit may be expressed by a coding block.

The prediction module 110 includes an inter prediction module that performs an inter prediction process and an intra prediction module that performs an intra prediction process. In order to enhance coding efficiency, a picture signal is not encoded without any change, but is encoded so as to reconstruct a picture by predicting a picture using a previously-encoded area and adding residual values between an original picture and the predicted picture to the predicted picture.

As a picture including a previously-encoded area used for the prediction, an I picture (I slice), a P picture (P slice), a B picture (B slice), and the like are known. The I slice is a slice which is decoded through only the intra prediction. The P slice is a slice which may be decoded through the inter prediction or the intra prediction using at least one motion vector and a reference picture index to predict sample values of blocks. The B slice is a slice which may be decoded through the inter prediction or the intra prediction using at least two motion vectors and reference picture indices to predict sample values of blocks.

The prediction module 110 performs a prediction process on process units of a picture to create a prediction block including predicted samples. In the prediction module 110, the process unit of a picture may be a CU, a TU, or a PU. It may be determined whether the prediction performed on the corresponding process unit is an inter prediction or an intra prediction, and specific details (for example, a prediction mode) of the prediction methods may be determined. The process unit subjected to the prediction process may be different from the process unit of which the prediction method and the specific details are determined. For example, the prediction method and the prediction mode may be determined by the PU units and the prediction process may be performed by the TU units.

In the inter prediction, a prediction process is performed on the basis of information on at least one of a previous picture and/or a subsequent picture of a current picture to create a prediction block. In the intra prediction, a prediction process is performed on the basis of pixel information of a current picture to create a prediction block.

In the inter prediction, a reference picture is selected for a current block, and a reference block having the same size as the current block is selected to create a prediction block of the current block. For example, in the inter prediction, a prediction block may be created so as to minimize a residual signal from the current block and to minimize the magnitude of a motion vector. On the other hand, a skip mode, a merge mode, an AMVP (Advanced Motion Vector Prediction), or the like may be used as the intra prediction method. The prediction block may be created in the unit of pixel samples less than an integer pixel, such as ½ pixel samples and ¼ pixel samples. Here, a motion vector may also be expressed in the unit of pixel samples less than an integer pixel. For example, luma pixels can be expressed in the unit of ¼ pixels and chroma pixels can be expressed in the unit of ⅛ pixels.

Information such as an index of a reference picture selected through the inter prediction, a motion vector predictor, and a residual signal is entropy-encoded and is transmitted to a decoder.

When the intra prediction is performed, the process unit subjected to the prediction process may be different from the process unit of which the prediction method and the specific details are determined. For example, a prediction mode may be determined in the unit of PU and the prediction process may be performed in the unit of PU. Alternatively, a prediction mode may be determined in the unit of PU and the inter prediction may be performed in the unit of TU.

The prediction modes in the intra prediction include 33 directional prediction modes and at least two non-directional modes. The non-directional modes include a DC prediction mode and a planar mode.

In the intra prediction, a prediction block may be created after a filter is applied to reference samples. At this time, it may be determined whether a filter should be applied to reference samples depending on the intra prediction mode and/or the size of the current block.

A PU may be determined in various sizes/shapes from a CU which is not divided any more. For example, in case of the inter prediction, a PU may have sizes such as 2N×2N, 2N×N, N×2N, and N×N. In case of the intra prediction, a PU may have sizes such as 2N×2N and N×N (where N is an integer). The PU having a size of N×N may be set to be applied to only a specific case. For example, the PU having a size of N×N can be set to be used for only a coding unit having the smallest size or can be set to be used for only intra prediction. In addition to the PUs having the above-mentioned sizes, PUs having sizes such as N×mN, mN×N, 2N×mN, and mN×2N (where m<1) may be additionally defined and used.

Residual values (a residual block or a residual signal) between the created prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TU and creates transform coefficients. The transform unit in the transform module 115 may be a TU and may have a quad tree structure. The size of the transform unit may be determined within a predetermined largest and smallest size range. The transform module 115 may transform the residual block using a DCT (Discrete Cosine Transform) and/or a DST (Discrete Sine Transform).

The quantization module 120 may quantize the residual values transformed by the transform module 115 and may create quantization coefficients. The values calculated by the quantization module 120 may be supplied to the inverse quantization module 135 and the rearrangement module 125.

The rearrangement module 125 may rearrange the quantization coefficients supplied from the quantization module 120. By rearranging the quantization coefficients, it is possible to enhance the encoding efficiency in the entropy encoding module 130. The rearrangement module 125 may rearrange the quantization coefficients in the form of a two-dimensional block to the form of a one-dimensional vector through the use of a coefficient scanning method. The rearrangement module 125 can enhance the entropy encoding efficiency in the entropy encoding module 130 by changing the order of coefficient scanning on the basis of stochastic statistics of the coefficients transmitted from the quantization module.

The entropy encoding module 130 performs an entropy encoding process on the quantization coefficients rearranged by the rearrangement module 125. Examples of the entropy encoding method include an exponential golomb method, a CAVLC (Context-Adaptive Variable Length Coding) method, and a CABAC (Context-Adaptive Binary Arithmetic Coding) method. The entropy encoding module 130 may encode a variety of information such as residual coefficient information and block type information of a coding unit, prediction mode information, division unit information, prediction unit information, transfer unit information, motion vector information, reference picture information, block interpolation information, and filtering information transmitted from the rearrangement module 125 and the prediction module 110.

The entropy encoding module 130 may give a predetermined change to a parameter set or a syntax to be transmitted, if necessary.

The inverse quantization module 135 inversely quantizes the values quantized by the quantization module 120. The inverse transform module 140 inversely transforms the values inversely quantized by the inverse quantization module 135. The residual values created by the inverse quantization module 135 and the inverse transform module 140 are merged with the prediction block predicted by the prediction module 110 to create a reconstructed block.

The filter module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the resultant values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter module 145 may not perform a filtering process on a reconstructed block used for the inter prediction.

The memory 150 stores the reconstructed block or picture calculated by the filter module 145. The reconstructed block or picture stored in the memory 150 is supplied to the prediction module 110 that performs the inter prediction.

Figure 2:
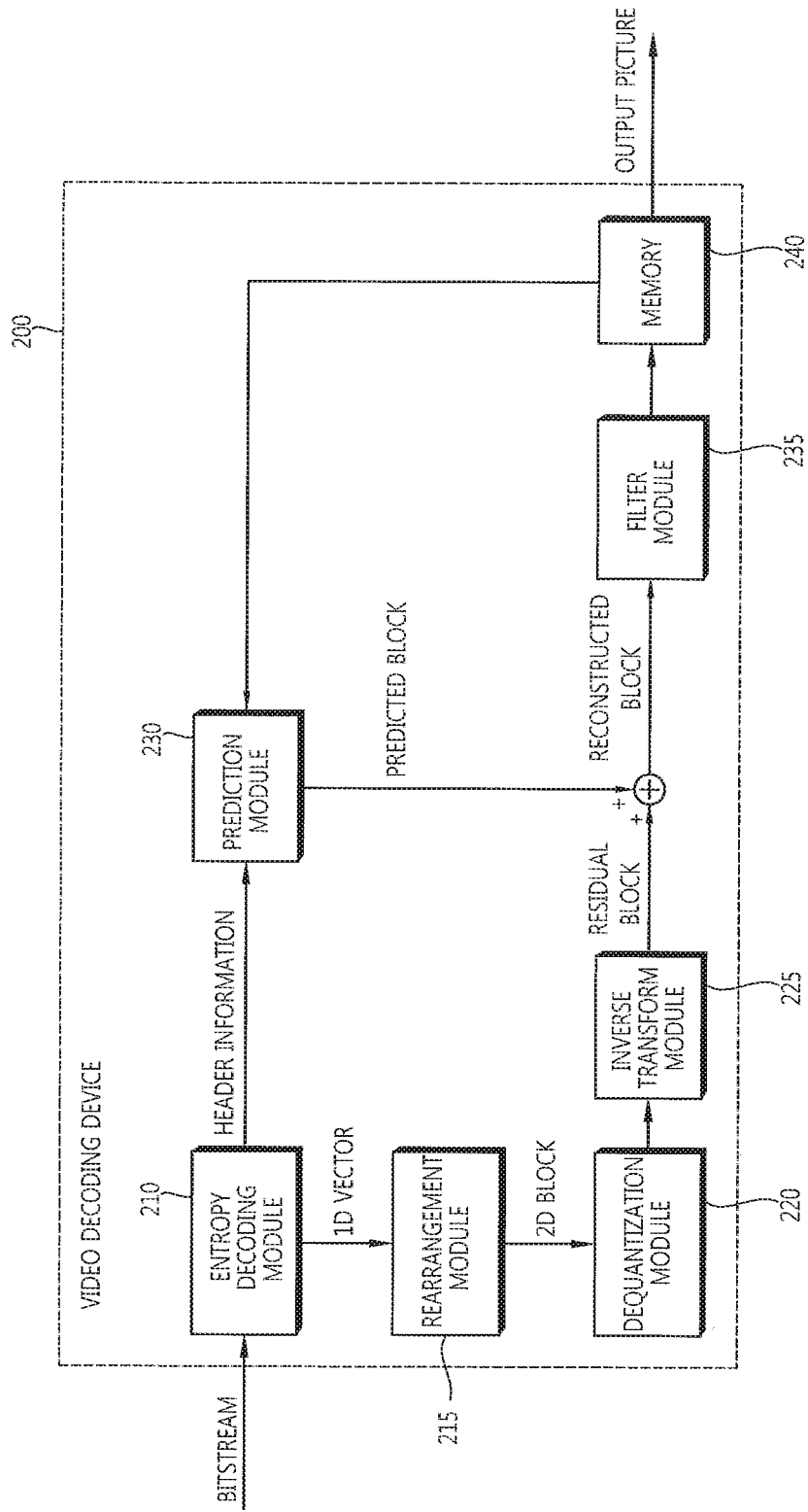
FIG. 2 is a block diagram schematically illustrating a video decoding device (decoder) according to an embodiment of the invention.

FIG. 2 is a block diagram schematically illustrating a video decoding device (decoder) according to an embodiment of the invention. Referring to FIG. 2, a video decoding device 200 includes an entropy decoding module 210, a rearrangement module 215, an inverse quantization module 220, an inverse transform module 225, a prediction module 230, a filter module 235, and a memory 240.

When a picture bitstream is input from the encoder, the input bitstream is decoded in the inverse order of the order in which video information is processed by the encoder.

For example, when the video encoding device uses a variable length coding (hereinafter, referred to as "VLC") method such as the CAVLC to perform the entropy encoding process, the video decoding module 210 can realize the same VLC table as the VLC table used in the video encoding device and may perform the entropy decoding process. When the video encoding device uses the CABAC to perform the entropy encoding process, the entropy decoding module 210 may perform the entropy decoding process using the CABAC to correspond thereto.

Information for creating a prediction block out of the information decoded by the entropy decoding module 210 is supplied to the prediction module 230, and the residual values entropy-decoded by the entropy decoding module are input to the rearrangement module 215.

The rearrangement module 215 rearranges the bitstream entropy-decoded by the entropy decoding module 210 on the basis of the rearrangement method in the video encoding device. The rearrangement module 215 reconstructs and rearranges coefficients expressed in the form of a one-dimensional vector into coefficients in the form of a two-dimensional block. The rearrangement module 215 is supplied with information associated with the coefficient scanning performed by the encoder and may perform the rearrangement using a method of inversely scanning the coefficients on the basis of the scanning order in which the scanning is performed by the encoder.

The inverse quantization module 220 performs inverse quantization on the basis of the quantization parameters supplied from the encoder and the rearranged coefficient values of the block.

The inverse transform module 225 performs the inverse DCT and inverse DST of the DCT and DST, which has been performed by the transform module of the video encoding device, on the quantization result from the video encoding device. The inverse transform is performed on the basis of a transfer unit or a division unit of a picture determined by the video encoding device. The transform module of the video encoding device selectively performs the DCT and DST depending on plural information elements such as the prediction method, the size of the current block, and the prediction direction, and the inverse transform module 225 of the video decoding device performs the inverse transform on the basis of the transform information on the transform performed by the transform module of the video encoding device.

The prediction module 230 creates a prediction block on the basis of prediction block creation information supplied from the entropy decoding module 210 and the previously-decoded block and/or picture information supplied from the memory 240. The reconstructed block may be created using the prediction block created by the prediction module 230 and the residual block supplied from the inverse transform module 225.

The specific prediction method performed by the prediction module 230 is the same as the prediction method performed by the prediction module of the encoder.

When the prediction mode of a current block is an intra prediction mode, an intra prediction process of creating a prediction block may be performed on the basis of pixel information of the current picture.

The prediction modes in the intra prediction include 33 directional prediction modes and at least two non-directional modes. The non-directional modes include a DC prediction mode and a planar mode.

In the intra prediction, a prediction block may be created after a filter is applied to reference samples. At this time, it may be determined whether a filter should be applied to reference samples depending on the intra prediction mode and/or the size of the current block.

When the prediction mode for the current block is the inter prediction mode, at least one of a previous picture and a subsequent picture of the current picture is used as a reference picture and the inter prediction process is performed on the current block on the basis of information included in the reference picture. Specifically, in the inter prediction, a reference picture for the current block is selected, a reference block having the same size as the current block is selected, and a prediction block of the current block is created. For example, in the inter prediction, a prediction block can be created so as to minimize the residual signal from the current block and to minimize the magnitude of a motion vector. Information of neighboring blocks of the current picture is used to use the information of the reference picture. For example, the prediction block of the current block is created on the basis of the information of the neighboring blocks through the use of a skip mode, a merge mode, an AMVP (Advanced Motion Vector Prediction) mode, or the like.

The prediction block may be created in the unit of pixel samples less than an integer pixel, such as ½ pixel samples and ¼ pixel samples. Here, a motion vector may also be expressed in the unit of pixel samples less than an integer pixel. For example, luma pixels can be expressed in the unit of ¼ pixels and chroma pixels can be expressed in the unit of ⅛ pixels.

Motion information necessary for the inter prediction of the current block, for example, information on motion vectors, reference picture indices, and the like, may be derived from a skip flag, a merge flag, and the like received from the encoder.

The process unit subjected to the prediction process may be different from the process unit of which the prediction method and the specific details are determined. For example, a prediction mode may be determined in the unit of PU and the prediction process may be performed in the unit of PU. Alternatively, a prediction mode may be determined in the unit of PU and the inter prediction may be performed in the unit of TU.

The residual block output from the inverse transform module 225 is added to the prediction block output from the prediction module 230 to reconstruct an original picture.

The reconstructed block and/or picture is supplied to the filter module 235. The filter module 235 performs a deblocking filtering process, an SAO (Sample Adaptive Offset) process, and/or an adaptive loop filtering process on the reconstructed block and/or picture.

The memory 240 stores the reconstructed picture or block for use as a reference picture or a reference block and supplies the reconstructed picture to the output module.

Although not described for the purpose of convenience for explanation, the bitstream input to the decoder may be input to the entropy decoding module through a parsing step. The parsing step may be performed by the entropy decoding module.

In this specification, coding may be analyzed as encoding or decoding in some cases, and information may be understood to include all of values, parameters, coefficients, elements, and the like.

A "frame" or a "picture" means a unit for expressing a video (image) of a specific time zone, and a "slice", a "frame", or the like means a unit constituting a part of a picture in actually coding a video signal and may be mixed with a picture in some cases.

"Pixel" or "pel" means the minimum unit constituting an picture. "Sample" may be used as a term representing the value of a specific pixel. A sample may be divided into a luma component and a chroma component and is generally used as a term including both. The chroma component represents a difference between determined colors and generally includes Cb and Cr.

"Unit" is used as a term representing a basic unit of video processing or a specific position of a picture, such as a prediction unit (PU) and a transform unit (TU), and can be mixed with terms "block" and "area" case by case. In general cases, a block is used as a term representing a set of samples or transform coefficients arranged in M columns and N rows.

On the other hand, in case of the inter prediction mode, the decoder and the encoder extract the motion information of a current block and perform the inter prediction on the current block on the basis of the extracted motion information.

A picture used for predicting a current block is referred to as a reference picture or a reference frame. The area in the reference picture can be expressed using a reference picture index (refIdx) indicating the reference picture and a motion vector.

A reference picture list for a current picture may be constructed by pictures used for prediction, and a reference picture index indicates a specific reference picture in the reference picture list. The P picture requires a single reference picture list such as reference list 0, and the B picture requires two reference picture lists such as reference list 0 and reference list 1.

Specifically, the I picture is a picture which is encoded/decoded through the intra prediction. The P picture is a picture which may be encoded/decoded through the inter prediction or the intra prediction using at least one motion vector and a reference picture index to predict sample values of blocks. The B picture is a picture which may be encoded/decoded through the inter prediction or the intra prediction using at least two motion vectors and reference picture indices to predict sample values of blocks.

The P picture requires one reference picture list, which is called reference picture list 0 (L0).

The B picture is a picture which may be encoded through forward, backward, and bi-directional inter prediction, for example, using two reference pictures. The B picture requires two reference picture lists, which are called reference picture list 0 (L0) and reference picture list 1 (L1).

The inter prediction using a reference picture selected from L0 is called L0 prediction. The L0 prediction is used mainly for forward prediction. The inter prediction using a reference picture selected from L1 is called L1 prediction. The L1 prediction is used mainly for backward prediction. The inter prediction using two reference pictures selected from L0 and L1 is called bi prediction.

The features of the I picture, the P picture, and the B picture may be defined in the unit of slices, not in the unit of pictures. For example, an I slice having the feature of the I picture in the unit of slices, a P slice having the feature of the P picture, and a B slice having the feature of the B picture may be defined.

For example, when the slice type of a current block is B and a colPic is selected from L0, or when the slice type of a current block is P, a colPic can be selected from L0.

On the other hand, in order to prevent a low delay, a GPB (Generalized P and B) slice may be used. In the GPB, reference picture list 0 and reference picture list 1 are identical to each other.

In the inter prediction, information of neighboring block may be used for a current block without any change in the skip mode. Accordingly, in the skip mode, syntax information such as residual values other than information indicating motion information of what block should be used as the motion information of the current block is not transmitted.

In the merge mode, motion information of neighboring blocks is used without any change to create a prediction block of the current block. The encoder transmits information on whether the merge mode should be applied, information on motion information of what block should be used, residual information, and the like. The decoder adds the residual block transmitted from the encoder to the prediction block to reconstruct the current block.

The method indicating information of what block should be used in the merge mode or the like may be applied to the skip mode and a general inter prediction mode. For example, a candidate block having information to be used as motion information of the current block in the merge mode may be used in common to other inter prediction modes, and the methods indicating motion information of what neighboring block should be used may be identically used.

At this time, in the skip mode and a general inter prediction mode, a neighboring block may be determined to have available motion information only when the reference picture index or the prediction direction (reference picture list) of the neighboring block is matched with the reference picture index or the prediction direction (reference picture list) of the current block, and a motion vector of the corresponding neighboring block may be used as a motion vector predictor candidate for the current block. Alternatively, the motion vectors of neighboring blocks may be scaled and used as motion vector predictor candidates for the current block.

In the AMVP mode, the encoder may predict the motion vector of the current block using motion information of neighboring blocks and may transmit a difference between the motion vector of the current block and the predicted motion vector along with the reference picture index indicating a reference picture. The decoder predicts the motion vector of the current block using motion information of neighboring blocks and derives the motion vector of the current block using the residual received from the encoder. The decoder creates a prediction block of the current block on the basis of the derived motion vector and the reference picture index information received from the encoder.

Figure 3:
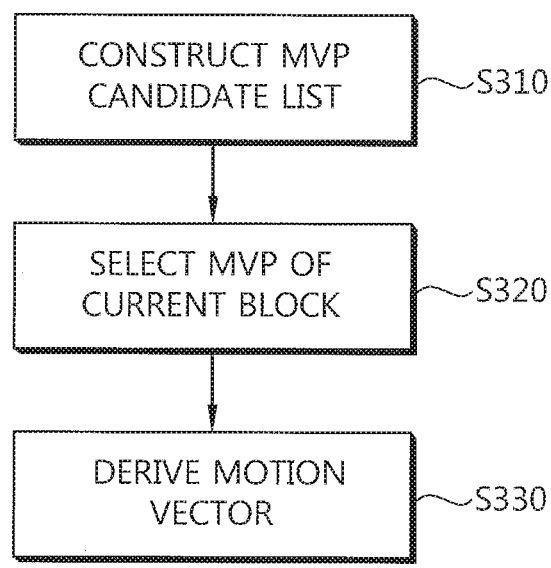
FIG. 3 is a flowchart schematically illustrating an example of a method of deriving a motion vector when an advanced motion vector predictor (AMVP) is applied in an inter prediction mode.

FIG. 3 is a flowchart schematically illustrating an example of a method of deriving a motion vector when the AMVP (Advanced Motion Vector Predictor) modes is applied as the inter prediction mode.

Referring to FIG. 3, an encoder or a decoder may construct a motion vector predictor (MVP) candidate list of a current block (S310). The motion vector predictor may represent a predicted value of the motion vector of the current block.

The encoder or the decoder may construct an MVP candidate list using the motion vector of an available neighboring block (hereinafter, referred to as "Col block" (co-located block) for the purpose of convenience for explanation) out of available neighboring blocks adjacent to the current block and/or available blocks of each reference picture located at the same position as (co-located with) the current block.

The encoder and the decoder may select the MVP of the current block out of the MVP candidates included in the MVP candidate list (S320).

The encoder may select the optimal MVP of the current block by applying motion vector competition (MVC) on the MVP candidates included in the MVP candidate list. The encoder may transmit the selected MVP index, an MVD (Motion Vector Difference which is also called Difference of Motion Vector (DMV)), and a reference picture index to the decoder through bitstream. The MVP index is an index indicating the MVP of the current block and may indicates any one of the MVP candidates included in the MVP candidate list. The reference picture index is an index indicating the reference picture of the current block and indicates any one of the reference picture candidates included in the reference picture list. The MVD represents a difference between the motion vector of the current block and the selected MVP. As the value of the MVD becomes smaller, the amount of data to be transmitted becomes smaller.

The decoder may receive the MVP index and the reference picture index from the encoder. The decoder may select the MVP of the current block out of the MVP candidates included in the MVP candidate list using the received MVP index. The decoder may select a reference picture of the current block out of the reference picture candidates included in the reference picture list using the received reference picture index.

The decoder may derive the motion vector of the current block using the selected MVP and the selected reference picture along with the received MVD (S330). For example, the decoder adds the received MVD to the MVP to reconstruct the motion vector of the current block.

Figure 4:
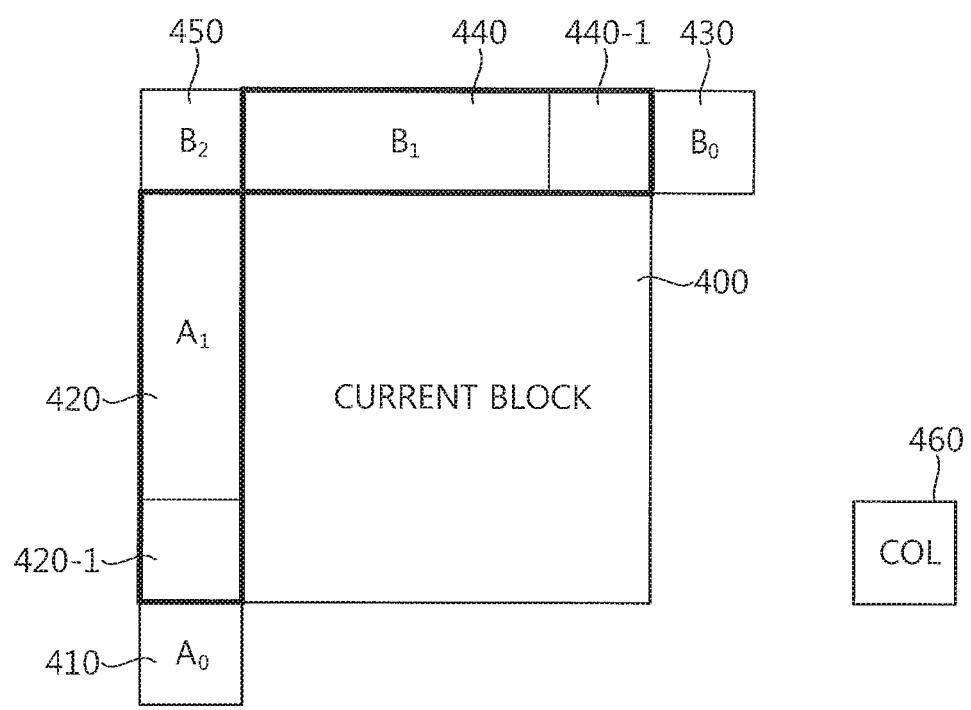
FIG. 4 is a conceptual diagram schematically illustrating an example of a method of generating an MVP candidate list.

FIG. 4 is a conceptual diagram schematically illustrating an example of a method of creating an MVP candidate list.

For the purpose of convenience for explanation, a candidate group including a left-bottom neighboring block Ac 410 which is a neighboring block at the left-bottom corner of a current block 400 and left neighboring blocks $A_1$ 420 of the current block 400 is referred as a left candidate group. Here, the encoder or the decoder may use only a block at a specific position out of the left neighboring blocks 420. For example, the encoder or the decoder may set the lowermost block 420-1 of the left neighboring blocks 420 as a left block $A_1$.

A candidate group including a upper-right neighboring block $B_3$ 430 which is a neighboring block at the upper-right corner of the current block 400, upper neighboring blocks $B_1$ 440 of the current block 400, and a upper-left neighboring block $B_2$ 450 which is a neighboring block at the upper-left corner of the current block 400 is referred as a upper candidate group. The encoder or the decoder may use only a block at a specific position out of the upper blocks 440. For example, the encoder or the decoder may set the rightmost block 440-1 out of the upper neighboring blocks as the upper block $B_1$.

The encoder and the decoder may select one MVP candidate from the left candidate group $A_0$ and $A_1$. The MVP candidate selected from the left candidate group is referred as $MV_A$. For example, the encoder or the decoder determines the sameness of the reference picture index as that of the current block, the sameness of the reference picture list as that of the current block, and the like while scanning the blocks included in the left candidate block in the order of $A_0 \rightarrow A_1$, and selects the motion vector of a first available block as the MVP candidate $MV_A$ of the current block.

The encoder or the decoder also selects one MVP candidate from the upper candidate group $B_0$, $B_1$, and $B_2$. The MVP candidate selected from the upper candidate group is referred as $MV_B$. For example, the encoder or the decoder determines the sameness of the reference picture index as that of the current block, the sameness of the reference picture list as that of the current block, and the like while scanning the blocks included in the left candidate block in the order of $B_0 \rightarrow B_1 \rightarrow B_2$, and selects the motion vector of a first available block as the MVP candidate $MV_B$ of the current block.

The encoder or the decoder may select the motion vector of a Col block COL 460 in a reference picture as the MVP candidate of the current block. Here, the motion vector of the Col block 660 is expressed by mvCol. Here, the encoder or the decoder may set the motion vector of the Col block as the MVP candidate when a necessary number of spatial candidates is not secured in the course of searching for $MV_A$ and $MV_B$.

In the above-mentioned embodiment, the MVP candidate selected from the left candidate group and the MVP candidate selected from the upper candidate group are referred to as spatial motion vector predictors (hereinafter, referred to as "SMVP"). The MVP candidate selected using the Col block in the reference picture is referred to as a temporal motion vector predictor (hereinafter, referred to as "TMVP"). Therefore, the MVP candidate list includes the SMVP and/or the TMVP.

When there are overlapping candidates out of the MVP candidates selected by the above-mentioned method, the encoder or the decoder removes the candidates other than the highest-ranked candidate out of the overlapping candidates.

It is described above that the candidate group is divided into the left candidate group $A_0$ and $A_1$ and the upper candidate group $B_0$, $B_1$, and $B_2$, but the candidate group is not limited to this division. For example, the left candidate group may include only $A_1$, the upper candidate group may include only B1, and a corner candidate group including $A_0$, $B_0$, and $B_2$ may be constructed. When the candidate group is divided into the left candidate group, the upper candidate group, and the corner candidate group, the sameness of the reference picture index as that of the current block, the sameness of the reference picture list as that of the current block, and the like may be determined and a predetermined number of MVP candidates for the current block may be selected.

At this time, in order to further accurately predict the motion vector of the current block, a motion vector (neighboring motion vector) selected from the neighboring blocks may be scaled.

For example, when there is no neighboring block having a reference frame (reference picture) corresponding to the reference frame (reference picture) of the motion vector $MV_C$ of the current block, the motion vectors of the neighboring blocks may be scaled to create a motion vector predictor (PMV (Predictor of Motion Vector) or MVP (Motion Vector Predictor).

Figure 5:
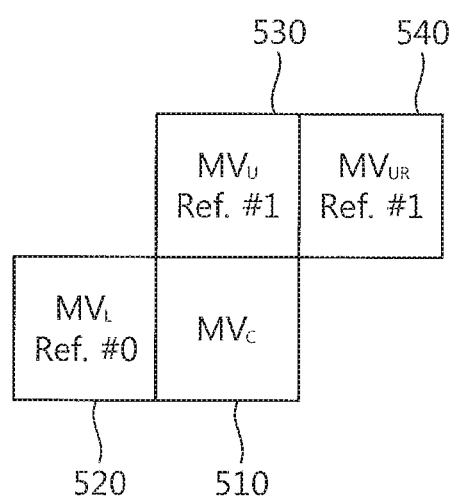
FIG. 5 is a conceptual diagram schematically illustrating a scaling method according to an embodiment of the invention.

FIG. 5 is a diagram illustrating a scaling method according to an embodiment of the invention and schematically shows a relationship between a current block and neighboring blocks thereof. For the purpose of convenience for explanation, an example of a method of scaling a motion vector in consideration of each of the left neighboring blocks, the upper neighboring blocks, and the corner neighboring blocks of a current block 510 will be described with reference to FIG. 5. In FIG. 5, the upper-right corner block of the current block out of the corner blocks is defined as a block representative of the neighboring corner blocks. The following description with reference to FIG. 5 can be similarly applied to other neighboring corner blocks.

Referring to FIG. 5, in an upper block 520, an upper-right block 530, a left block 540 of the current block 510, $MV_C$ represents a motion vector of the current block 510, $MV_U$ represents a motion vector of the upper block 520, $MV_{UR}$ represents a motion vector of the upper-right block 530, and $MV_L$ represents a motion vector of the left block 540. It is assumed that the reference picture index of the upper block 520 of the current block 510 is 1 (Ref. #1), the reference picture index of the upper-right block 530 of the current block 510 is 1 (Ref. #1), and the reference picture index of the left block 540 of the current block 510 is 1 (Ref. #0). The reference picture index means a reference frame (reference picture) index indicated by the motion vector of each block.

In FIG. 5, when the 0-th reference frame (reference picture) in the reference picture list stored in the memory (buffer) is used for motion estimation, the motion vector $MV_L$ is used to create the motion vector predictor of the 0-th reference frame. When the first reference frame in the reference picture list is used for motion estimation, three motion vectors are used to create the motion vector predictor of the first reference frame. The motion vector predictors of the second to fourth reference frames in the reference picture list have the same value as the motion vector predictor of the first reference frame.

A difference value between the motion vector $MV_C$ estimated for the current block and the motion vector predictor is calculated on the basis of the created motion vector predictors and MVD is transmitted to the decoder.

In the example shown in FIG. 5, when the 0-th to first reference frame in the reference picture list which is the same reference frame as the reference frame (reference picture) of a neighboring block is used for motion estimation, it is possible to create an appropriate motion vector predictor. However, when a reference frame different from the reference frames (reference picture) of the neighboring blocks is used for motion estimation, the created motion vector predictor may have a large difference from the motion vector $MV_C$ of the current block. This is because since there is no neighboring block having a reference frame corresponding to the reference frame of the motion vector $MV_C$ of the current block, it is difficult to effectively predict the motion vector of the current block using information of the neighboring blocks.

In this case, by using up-scaling or down-scaling on the motion vectors of the neighboring blocks of the current block, it is possible to create a motion vector predictor closer to the motion vector $MV_C$ of the current block and to reduce an amount of bits of the MVD encoded and transmitted.

For example, when it is assumed that the reference pictures of the upper block 520, the upper-right block 530, and the left block 540 which are the neighboring blocks of the current block 510 are different from the reference picture of the current block, the motion vectors of the neighboring blocks 520, 530, and 540 may be up-scaled or down-scaled by linear interpolation as expressed by Expression 1.

$$MV'_L = \frac{f_{ME} - f_C}{f_L - f_C} \times MV_L$$

$$MV'_U = \frac{f_{ME} - f_C}{f_U - f_C} \times MV_U$$

$$MV'_{UR} = \frac{f_{ME} - f_C}{f_{UR} - f_C} \times MV_{UR}$$

⟨Expression 1⟩

In Expression 1, $f_L$ represents the reference frame number (or the reference picture index) of the left block of the current block, $f_U$ represents the reference frame number of the upper block of the current block, $f_{UR}$ represents the reference frame number of the upper-right block of the current block out of the corner blocks, $f_{ME}$ represents the reference frame number subjected to motion estimation, and $f_C$ represents the current frame number.

By the linear interpolation expressed by Expression 1, the motion vectors of the neighboring blocks of the current block are up-scaled or down-scaled. The motion vector predictor of the current block may be created using the scaled motion vectors of the neighboring blocks. At this time, the encoder or the decoder may create the motion vector predictor in various methods. For example, any one of the motion vectors of the neighboring blocks may be selected and used as the motion vector predictor, an average of the motion vectors of the neighboring blocks may be used as the motion vector predictor, or a value obtained by median-filtering the motion vectors of the neighboring blocks may be used as the motion vector predictor.

Figure 6:
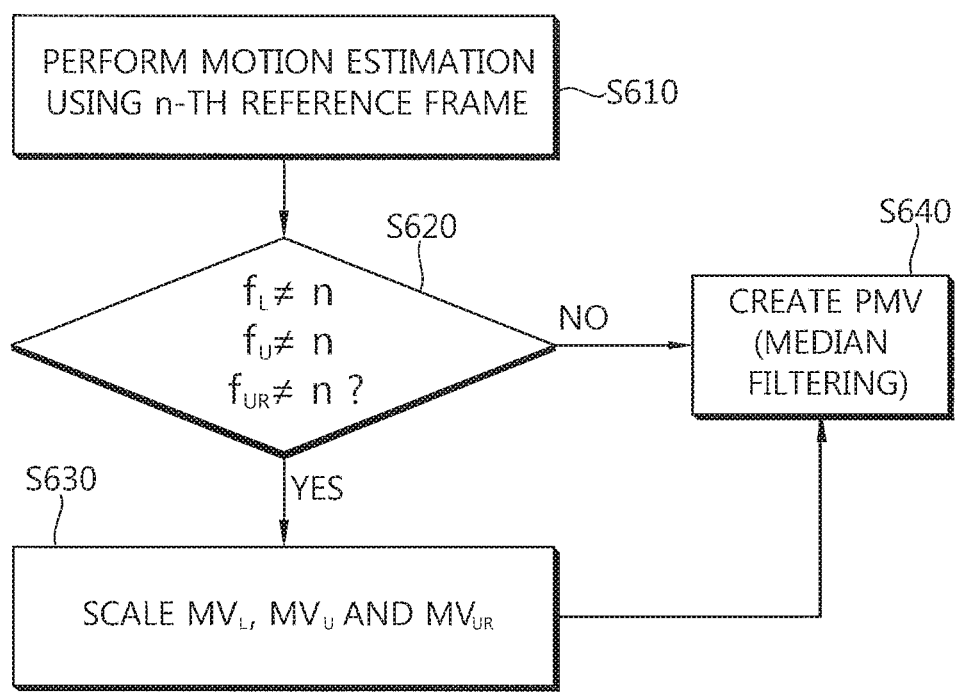
FIG. 6 is a flowchart schematically illustrating the scaling method according to the embodiment of the invention.

FIG. 6 is a flowchart schematically illustrating a scaling method according to an embodiment of the invention.

Referring to FIG. 6, the encoder or the decoder performs motion estimation using the n-th reference frame (S610). The n-th reference frame is an n-th reference picture (reference frame) in a reference picture list and may be a reference frame (reference picture) of the current block.

The encoder or the decoder may determine whether the reference frame number (reference picture index in the case of a reference picture) of the neighboring block is different from n (S620). For example, when the left block of the current block, the upper block of the current block, and the upper-right corner block of the current block out of the corner blocks are considered as the neighboring blocks, the encoder or the decoder determines whether the values of the reference frame number $f_L$ of the left block, the reference frame number $f_U$ of the upper block, and the reference frame number $f_{UR}$ of the upper-right corner block are difference from n.

The encoder or the decoder may scale the motion vectors of the neighboring blocks when the reference frame numbers of the neighboring blocks are different from n (S630). For example, when the left, upper, and upper-right blocks of the current block considered as the neighboring blocks as described above and the values of $f_L$, $f_U$, and $f_{UR}$ are different from n, the encoder or the decoder may scale the motion vectors of the corresponding blocks, that is, the motion vector $MV_L$ of the left block of the current block, the motion vector $MV_U$ of the upper block of the current block, and the motion vector $MV_{UR}$ of the upper-right block of the current block.

The encoder or the decoder may create a motion vector predictor of the current block (S640). When any one of the neighboring blocks has the same reference frame number as the reference frame of the current block, the encoder or the decoder may create the motion vector predictor of the current block using the motion vector of the corresponding block. For example, when at least one of the values of $f_L$, $f_U$, and $f_{UR}$ is equal to n, it is possible to create the motion vector predictor of the current block using the motion vectors of the neighboring blocks having the reference frame number n. When the values of $f_L$, $f_U$, and $f_{UR}$ are different from n, the encoder or the decoder may scale the motion vectors of the neighboring blocks as described above to create the motion vector predictor of the current block. Expression 1 may be used as the scaling method.

The encoder or the decoder may calculate the median value of the scaled motion vectors or the non-scaled motion vectors of the neighboring blocks to create the motion vector predictor of the current block. Alternatively, the encoder or the decoder may calculate an average value of the scaled motion vectors or the non-scaled motion vectors of the neighboring blocks to create the motion vector predictor of the current block. Alternatively, the encoder or the decoder may use any one of the scaled motion vectors or the non-scaled motion vectors of the neighboring blocks as the motion vector predictor of the current block.

For the purpose of convenience for explanation, the left block 520 representative of the neighboring blocks located on the left side of the current block, the upper block 530 representative of the neighboring blocks located on the upper side of the current block, and the upper-right block 540 representative of the blocks located at the neighboring corners of the current block are exemplified as the neighboring blocks of the current block, but the above-mentioned method may be applied in consideration of all the neighboring blocks or the blocks located at other positions out of the neighboring blocks.

For example, as shown in FIG. 4, the motion vector predictor may be created using three corner blocks 410, 430, and 450, any one of the left blocks 420, and any one of the upper blocks 440. In this case, a block 420-1 located at a specific position out of the left blocks 420 may be used or a block 440-1 located at a specific position out of the upper blocks 440 may be used.

By determining whether there is a block having the same reference frame as the reference frame (reference picture) of the current block on the left candidate group $A_0$ and $A_1$ and on the upper candidate group $B_0$, $B_1$, and $B_2$, the candidates may be selected one by one. When there is no block having the same reference frame (reference picture) as the reference frame (reference picture) of the current block in the blocks of the left candidate group, the motion vectors of the left candidate blocks or the blocks selected from the left candidate blocks may be scaled. When there is no block having the same reference frame (reference picture) as the reference frame (reference picture) of the current block in the blocks of the upper candidate group, the motion vectors of the upper candidate blocks or the blocks selected from the upper candidate blocks may be scaled.

Figure 7:
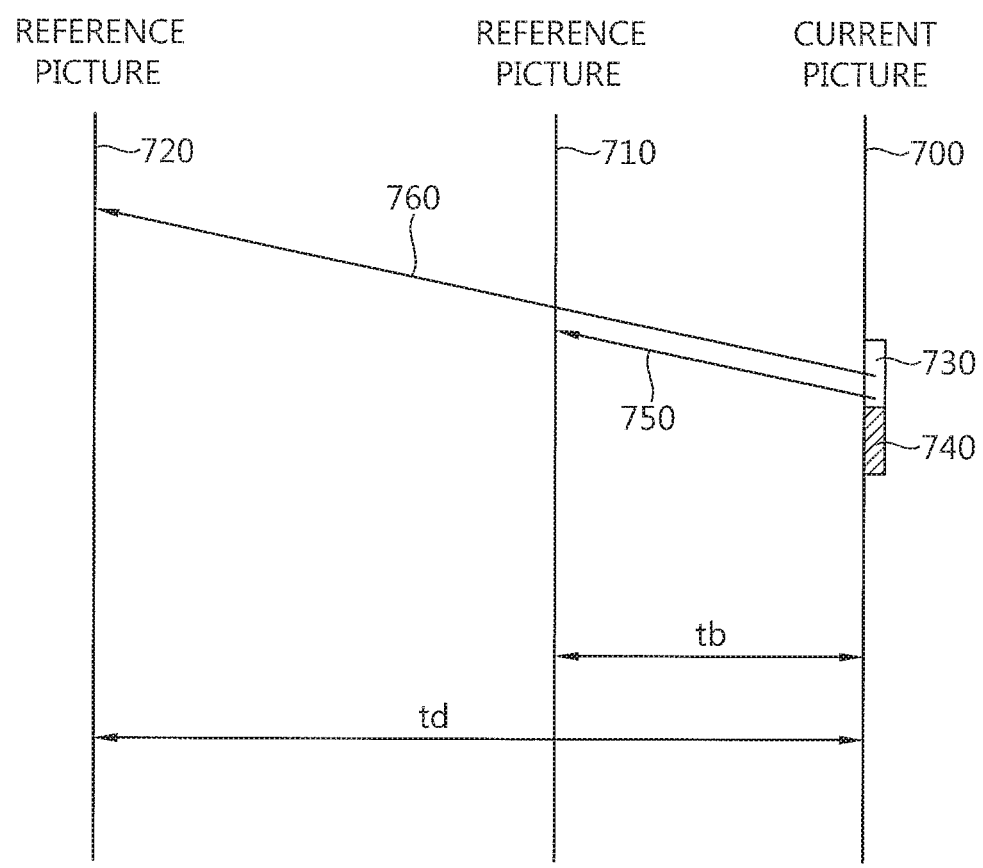
FIG. 7 is a diagram schematically illustrating a method of scaling motion vectors of neighboring blocks of a current block in a current picture (current frame).

FIG. 7 is a diagram schematically illustrating a method of scaling the motion vectors of the neighboring blocks of the current block in the current picture (current frame) according to an embodiment of the invention.

Referring to FIG. 7, the reference picture of a neighboring block 730 of a current block 740 in a current picture 700 may or may not be identical to the reference picture of the current block 740.

When the reference picture of the current block 740 and the reference picture of the neighboring block 730 are identical to each other as a reference picture 710, the motion vector 750 of the neighboring block 730 may be used to create the motion vector predictor of the current block without scaling. At this time, the neighboring block 730 may have a reference picture list identical to that of the current block 740 or may have a reference picture list different therefrom. For example, when the reference picture of the current block 740 is an N-th reference picture in reference picture list L0 and the neighboring block 730 has a reference picture identical to that of the current block 740 and a reference picture list identical thereto, the motion vector 750 of the neighboring block 730 can be expressed by mvL0N.

On the other hand, when the reference picture of the current block 740 which is a reference picture 710 and the reference picture of the neighboring block 730 which is a reference picture 720 are different from each other, the motion vector 760 of the neighboring block 730 may be scaled and the scaled motion vector may be used to create the motion vector predictor or of the current block. At this time, the neighboring block 730 may have a reference picture list identical to that of the current block 740 or may have a reference picture list different from that of the current block 740. For example, when the reference picture of the current block 740 is an N-th reference picture in reference picture list L0 and the neighboring block 730 has a reference picture different from that of the current block 740 and a reference picture list identical thereto, the motion vector 750 of the neighboring block 730 may be expressed by mvL0N_scaled.

The motion vector of the neighboring block may be scaled in consideration of the magnitude of a distance tb between the reference picture of the current block and the current block and the magnitude of a distance td between the reference picture of the neighboring block and the current picture. A method expressed by Expression 2 can be used as an example of the method of scaling the motion vector of a neighboring block.

$$mvL0N\_scaled = (DistScaleFactor * mvL0N + 128) >> 8 \quad <\text{Expression 2}>$$

Here, DistScaleFactor represents a scaling factor determined in consideration of the magnitudes of two distances tb and td as described above. At this time, a constant 128 may be used as in Expression 2 in case of rounding-up, and a constant 127 instead of the constant 128 may be used in case of rounding-down. For example, when the scaling result in a quarter pel unit (¼ pixel block) is 1.5, the rounding result of 2 can be obtained using the constant 128 and the rounding result of 1 can be obtained using the constant 127. Here, in case of rounding down, the rounding-down directed to 0 may be applied. For example, when the rounding-down is applied to a value of −1.5, the rounding-down may be applied to be a value of −1, not −2.

DistScaleFactor can be determined in various ways, and Expressions 3 and 4 are examples of the method of determining DistScaleFactor.

$$DistScaleFactor = Clip3(-1024, 1023, (tb*tx+32) >> 6) \quad <\text{Expression 3}>$$

$$DistScaleFactor = Clip3(-4096, 4095, (tb*tx+32) >> 6) \quad <\text{Expression 4}>$$

Here, tx in Expressions 3 and 4 can be set to tx=(16384+(Abs(td)/2))/td as in derivation of a temporal motion vector candidate of H.264/MPEG-4 AVC (see 8.4.1.2.3 of the H.264 standard).

On the other hand, the neighboring blocks used to create the motion vector predictor can be selected through motion vector competition. The motion vector competition means that a most suitable motion vector is selected out of plural motion vector candidates and is used as a predicted value. In this case, the Col block which is a temporal neighboring block as well as spatial neighboring blocks of the current block can also be considered.

Figure 8:
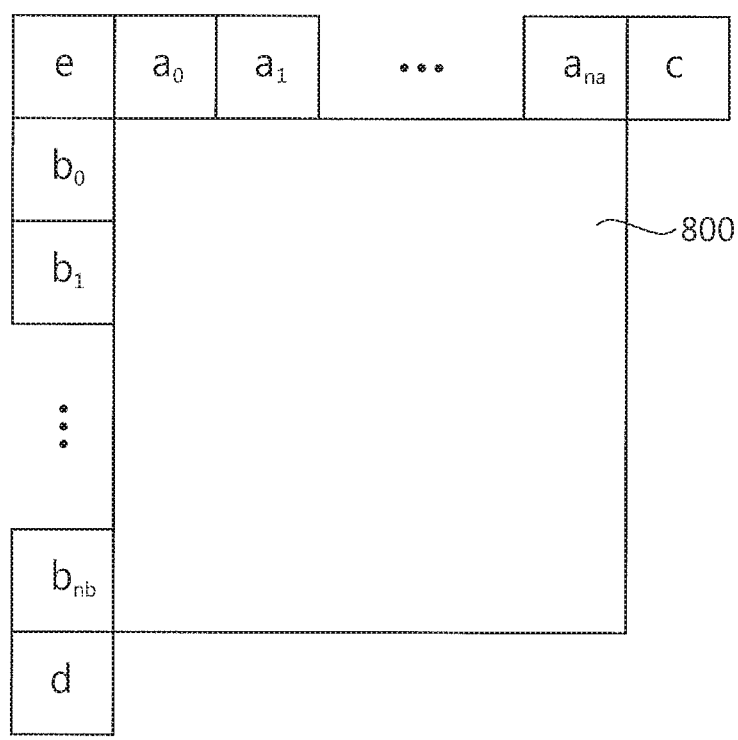
FIG. 8 is a diagram schematically illustrating a method of performing motion vector competition according to an embodiment of the invention.

FIG. 8 is a diagram schematically illustrating a method of performing the motion vector competition according to an embodiment of the invention. FIG. 8 shows spatial neighboring blocks out of neighboring blocks of a current block 800.

Referring to FIG. 8, the spatial neighboring blocks shown in FIG. 8 include na (where na is an integer equal to or greater than 1) upper group blocks $a_0$, $a_1$, . . . , and $a_{na}$ located on the upper side of the current block 800, nb (where nb is an integer equal to or greater than 1) left group blocks $b_0$, $b_1$, . . . , and $b_{nb}$ located on the left side of the current block 800, and corner group blocks c, d, and e located at the upper-right corner, the left-lower corner, and the left-upper corner of the current block 800.

In the example shown in FIG. 8, the motion vector candidates in the AMVP (Advanced Motion Vector Prediction) can be calculated as expressed by Expression 5.

Motion vector candidates={median($a', b', c'$),$a', b', c'$, temporal predictor}      <Expression 5>

In Expression 5, three spatial motion vectors a', b', and c' mean motion vectors of first available blocks having a reference picture list identical to that of the current block 800 and a reference picture index identical to that of the current block in the groups (blocks located on the upper side of the current block, blocks located on the left side of the current block, and blocks located at the corners of the current block). The encoder or the decoder can create the motion vector predictor candidate list described with reference to FIG. 3 using all or a part of the motion vector candidates expressed by Expression 5.

The encoder or the decoder can selects a predetermined candidate of the motion vector candidates expressed by Expression 5 as the motion vector predictor of the current block. At this time, the encoder or the decoder can select the MVP of the current block in consideration of all or a part of the motion vectors expressed by Expression 5. For example, the encoder may select a candidate having the smallest residual value from the motion vector of the current block out of the motion vector candidates expressed by Expression 5 as the MVP of the current block and may transmit information thereon to the decoder. The encoder may select an available motion vector in consideration of only some motion vectors, for example, a', b', and c', out of the motion vectors expressed by Expression 5 and may additionally consider temporal predictors when a', b', and c' are not considered (non available).

In Expression 5, median(a', b' c') represents a median vector of a', b', and c' and the following ways 1) to 4) can be used as an example of the median vector.

1) When all of a', b', and c' are available, the values of a', b', and c' are calculated to calculate a median vector.

2) When only two of a', b', and c' are available, the value of the non-available motion vector is set to 0 to calculate a median vector.

3) When only one of a', b', and c' is available, the available motion vector is used as a median vector.

4) When 1) to 3) are not satisfied, the value of a median vector is set to 0.

At this time, the non-available motion vectors of the motion vectors a', b', and c' are not included in the motion vector candidates. The temporal motion vector predictor means a co-located motion vector with the current block in a picture (frame) other than the current picture (frame).

On the other hand, an example of a pseudo code for calculating a motion vector of a first available block having a reference picture list identical to that of the current block 800 and a reference picture index identical thereto out of na (where na is an integer equal to or greater than 1) located on the upper side of the current block 800 is shown in Table 1.

TABLE 1 a' = not available
For (i=0 ; i<na ; i++) {
   if ( i-th block is inter mode and refers to identical ref_idx in list identical to current block? ) {
      a' = ai
      break;
   }
}

In Table 1, search is carried out in a search order of from $a_0$ to $a_{na}$, but the invention is not limited to this order and the motion vector of the first available block having a reference picture list identical to that of the current block 800 and a reference picture index identical thereto may be derived by carrying out the search in a search order of from $a_{na}$ to $a_0$.

On the other hand, unlike the example shown in Table 1, the motion vector of an inter mode block which is first searched for out of the upper group blocks regardless of the reference picture list and the reference picture index may be scaled and the scaled motion vector may be allocated as the value of a'. In this case, an example of a pseudo code for deriving the motion vector a' is shown in Table 2.

TABLE 2 a' = not available
For ( i=0 ; i<na ; i++ ) {
   if ( i-th block is inter mode ) {
      a' = scale ( ai )
      break;
   }
}

In Table 2, search is carried out in a search order of from $a_0$ to $a_{na}$, but the invention is not limited to this order and the motion vector may be derived by carrying out the search in a search order of from $a_{na}$ to $a_0$ and scaling a motion vector of a first available block having a reference picture list identical to that of the current block 800 and a reference picture index identical thereto.

The motion vector b' of a first available block having a reference picture list identical to the current block 800 and a reference picture index identical thereto out of nb (where nb is an integer equal to or greater than 1) left group blocks $b_0, b_1, \ldots,$ and $b_{nb}$ can be obtained similarly to Table 1. In this case, an example of a pseudo code for deriving the motion vector b' is shown in Table 3.

TABLE 3 b' = not available
For ( i=0 ; i<nb ; i++ ) {
   if ( i-th block is inter mode and refers to identical ref_idx in list identical to current block? ) {
      b' = bi
      break;
   }
}

In Table 3, search is carried out in a search order of from $b_0$ to $b_{nb}$, but the invention is not limited to this order and the motion vector of a first available block having a reference picture list identical to that of the current block 800 and a reference picture index identical thereto may be derived by carrying out the search in a search order of from $b_{nb}$ to $b_0$.

On the other hand, unlike the example shown in Table 3, the motion vector of an inter mode block which is first searched for out of the left group blocks regardless of the reference picture list and the reference picture index may be scaled and the scaled motion vector may be allocated as the value of b'. In this case, an example of a pseudo code for obtaining the motion vector b' is shown in Table 4.

TABLE 4 b' = not available
For ( i=0 ; i<nb ; i++ ) {
   if ( i-th block is inter mode ) {
      b' = scale ( bi )
      break;
   }
}

In Table 4, search is carried out in a search order of from $b_0$ to $b_{nb}$, but the invention is not limited to this order and the motion vector may be obtained by carrying out the search in a search order of from $b_{nb}$ to $b_0$ and scaling a motion vector of a first available block having a reference picture list identical to that of the current block 800 and a reference picture index identical thereto.

The motion vector c' of a first available block having a reference picture list identical to the current block 800 and a reference picture index identical thereto out of three corner group blocks c, d, and e can be obtained similarly to Table 1. An example of a pseudo code for deriving the motion vector b' is shown in Table 5. In Table 5, $c_0$=c, $c_1$=d, and $c_2$=e are described for the purpose of convenience for explanation.

TABLE 5

```
c' = not available
For ( i=0 ; i<3 ; i++ ) {
    if ( i-th block is inter mode and refers to identical ref_idx
in list identical to current block? ) {
        c' = ci
        break;
    }
}
```

In Table 5, search is carried out in a search order of from $c_0$ to $c_2$, but the invention is not limited to this order and the motion vector of a first available block having a reference picture list identical to that of the current block 800 and a reference picture index identical thereto may be obtained by carrying out the search in a search order of from $c_2$ to $c_0$ or a search order of $c_1 \rightarrow c_2 \rightarrow c_0$ or $c_1 \rightarrow c_0 \rightarrow c_2$.

On the other hand, unlike the example shown in Table 5, the motion vector of an inter mode block which is first searched for out of the corner group blocks regardless of the reference picture list and the reference picture index may be scaled and the scaled motion vector may be allocated as the value of c'. In this case, an example of a pseudo code for deriving the motion vector c' is shown in Table 6.

TABLE 6

```
c' = not available
For ( i=0 ; i<3 ; i++ ) {
    if ( i-th block is inter mode ) {
        c' = scale ( ci )
        break;
    }
}
```

In Table 6, search is carried out in a search order of from $c_0$ to $c_2$, but the invention is not limited to this order and the motion vector may be derived by carrying out the search in a search order of from $c_2$ to $c_0$ or a search order of $c_1 \rightarrow c_2 \rightarrow c_0$ or $c_1 \rightarrow c_0 \rightarrow c_2$ and scaling a motion vector of a first available block having a reference picture list identical to that of the current block 800 and a reference picture index identical thereto.

On the other hand, only when the motion vector is not available, a motion vector of an inter mode block which is first searched for in the corresponding neighboring group regardless of the reference picture list and the reference picture index may be scaled and the scaled motion vector may be allocated as a motion vector candidate.

In Tables 1 to 6, the block having a reference picture identical to that of the current block and a reference picture list identical thereto is set as an available block. In Tables 2, 4, and 6, even when the reference picture and the reference picture list of a block are different from those of the current block, the motion vector of the corresponding block can be used by scaling in case of the block in the inter prediction mode.

In Tables 7 to 12, when the reference picture and the reference picture list of a block are different from those of the current block, it is described that the motion vector of the corresponding block is used by scaling in case of the block in the inter prediction mode.

Table 7 shows an example of a pseudo code for calculating a motion vector a' by scaling the motion vector of an inter mode block which is first searched for out of the upper group blocks when the motion vectors of the upper group blocks are not available.

TABLE 7

```
a' = not available
For ( i=0 ; i<na ; i++ ) {
    if ( i-th block is inter mode and refers to identical ref_idx in
list identical to current block? ) {
        a' = ai
        break;
    }
}
If ( a' is not available ) {
    For ( i=0 ; i<na ; i++ ) {
        if ( i-th block is inter mode ) {
            a' = scale ( ai )
            break;
        }
    }
}
```

In Table 7, search is carried out in a search order of from $a_0$ to $a_{na}$, but the invention is not limited to this order and the motion vector may be obtained by carrying out the search in a search order of from $a_{na}$ to $a_0$ and scaling a motion vector of a first available block.

Table 8 shows an example of a pseudo code for deriving a motion vector b' by scaling the motion vector of an inter mode block which is first searched for out of the left group blocks when the motion vectors of the left group blocks are not available.

TABLE 8

```
b' = not available
For ( i=0 ; i<nb ; i++ ) {
    if ( i-th block is inter mode and refers to identical ref_idx in
list identical to current block? ) {
        b' = bi
        break;
    }
}
If ( a' is not available ) {
    For ( i=0 ; i<nb ; i++ ) {
        if ( i-th block is inter mode ) {
            b' = scale ( bi )
            break;
        }
    }
}
```

In Table 8, search is carried out in a search order of from $b_0$ to $b_{nb}$, but the invention is not limited to this order and the motion vector may be derived by carrying out the search in a search order of from $b_{nb}$ to $b_0$ and scaling a motion vector of a first available block.

Table 9 shows an example of a pseudo code for obtaining a motion vector c' by scaling the motion vector of an inter mode block which is first searched for out of the left group blocks when the motion vectors of the left group blocks are not available.

TABLE 9

```
c' = not available
For ( i=0 ; i<3 ; i++ ) {
    if ( i-th block is inter mode and refers to identical ref_idx in
list identical to current block? ) {
            c' = ci
            break;
        }
}
If ( a' is not available ) {
    For ( i=0 ; i<3 ; i++ ) {
        if ( i-th block is inter mode ) {
            c' = scale ( ci )
            break;
        }
    }
}
```

In Table 9, search is carried out in a search order of from $c_0$ to $c_2$, but the invention is not limited to this order and the motion vector may be obtained by carrying out the search in a search order of $c_1 \rightarrow c_2 \rightarrow c_0$ or $c_1 \rightarrow c_0 \rightarrow c_2$ and scaling a motion vector of a first available block.

On the other hand, although similar to the above-mentioned methods, a motion vector to be scaled may be determined with the following priority when the motion vectors of the neighboring blocks of the current block are not available.

<Priority>

(1) A block which refers to a reference picture identical to that of the current block (which may be appeared when list 0 (L0) and list 1 (L1) have the same reference pictures)

(2) A block having identical reference picture list if there is no available motion vector in the motion vectors of neighboring blocks when above (1) is checked.

(3) The other inter mode block if there is no available motion vector in the motion vectors of neighboring blocks when above (2) is checked.

Therefore, the encoder or the decoder may determine any one of the neighboring blocks of the current block with the priorities of 1) to 3) and may scale the motion vector of the corresponding block.

Table 10 shows an example of a pseudo code for obtaining a motion vector a' by selecting any block of the upper group blocks and scaling the motion vector of the corresponding block.

TABLE 10

```
a' = not available
For (i=0; i<na; i++ )
    if ( i-th block is inter mode and refers to identical ref_idx
in list identical to current block? ) {
            a' = ai
            break;
        }
}
If ( a' is not available ) {
    For (i=0; i<na; i++ ) {
        if ( i-th block is inter mode and refers to ref_idx
identical to current block? ) {
            a' = ai // particular scaling is not necessary
because identical ref_pic is referred to
            break;
        }
    }
}
If ( a' is not available )
    For ( i=0; i<na; i++ ) {
        if ( i-th block is inter mode and refers to list identical
to current block? )
            a' = scale ( ai )
```

TABLE 10-continued

```
            break;
        }
    }
}
If ( a' is not available ) {
    For ( i=0; i<na; i++ ) {
        if ( i-th block is inter mode )
            a' = scale ( ai )
            break;
        }
    }
}
If ( a' is not available )
    For ( i=0; i<na; i++ )
        if ( i-th block is inter mode )
            a' = scale ( ai )
            break;
        }
    }
}
```

In Table 10, search is carried out in a search order of from $a_0$ to $a_{na}$, but the invention is not limited to this order and the motion vector may be derived by carrying out the search in a search order of from $a_{na}$ to $a_0$ and scaling a motion vector of a first available block.

Table 11 shows an example of a pseudo code for obtaining a motion vector b' by selecting any block of the left group blocks on the basis of the above-mentioned priorities and scaling the motion vector of the corresponding block.

TABLE 11

```
b' = not available
For (i=0; i<nb; i++ )
    if ( i-th block is inter mode and refers to identical ref_idx
in list identical to current block? ) {
            b' = bi
            break;
        }
}
If ( b' is not available ) {
    For (i=0; i<nb; i++ ) {
        if ( i-th block is inter mode and refers to ref_idx
identical to current block? ) {
            b' = bi // particular scaling is not necessary
because identical ref_pic is referred to
            break;
        }
    }
}
If ( b' is not available )
    For ( i=0; i<nb; i++ ) {
        if ( i-th block is inter mode and refers to list identical
to current block? )
            b' = scale ( bi )
            break;
        }
    }
}
If ( b' is not available ) {
    For ( i=0; i<nb; i++ ) {
        if ( i-th block is inter mode )
            b' = scale ( bi )
            break;
        }
    }
}
If ( b' is not available )
    For ( i=0; i<nb; i++ )
        if ( i-th block is inter mode )
            b' = scale ( bi )
            break;
        }
    }
}
```

In Table 11, search is carried out in a search order of from $b_0$ to $b_{nb}$, but the invention is not limited to this order and the motion vector may be obtained by carrying out the search in a search order of from $b_{nb}$ to $b_0$ and scaling a motion vector of a first available block.

Table 12 shows an example of a pseudo code for deriving a motion vector c' by selecting any block of the left group blocks on the basis of the above-mentioned priorities and scaling the motion vector of the corresponding block.

TABLE 12

```
c' = not available
For (i=0; i<3; i++ )
    if ( i-th block is inter mode and refers to identical ref_idx
in list identical to current block? ) {
            c' = ci
            break;
    }
}
If ( c' is not available ) {
    For (i=0; i<3; i++ ) {
            if ( i-th block is inter mode and refers to ref_idx
identical to current block? ) {
                    c' = ci // particular scaling is not
necessary because identical ref_pic is referred to
                    break;
            }
    }
}
If ( c' is not available )
    For ( i=0; i<3; i++ ) {
            if ( i-th block is inter mode and refers to list identical
to current block? )
                    c' = scale ( ci )
                    break;
            }
    }
}
If ( c' is not available ) {
    For ( i=0; i<3; i++ ) {
            if ( i-th block is inter mode )
                    c' = scale ( ci )
                    break;
            }
    }
}
If ( c' is not available )
    For ( i=0; i<3; i++ )
            if ( i-th block is inter mode )
                    c' = scale ( ci )
                    break;
            }
    }
}
```

In Table 12, search is carried out in a search order of from $c_0$ to $c_2$, but the invention is not limited to this order and the motion vector may be obtained by carrying out the search in a search order of $c_1 \rightarrow c_2 \rightarrow c_0$ or $c_1 \rightarrow c_0 \rightarrow c_2$ and scaling a motion vector of a first available block.

In Tables 10 to 12, it is described that a scaling target is selected on the basis of the above-mentioned priorities and an available motion vector candidate is derived, but the priorities are not limited to the above-mentioned and may be changed and applied in various forms if necessary.

On the other hand, the above-mentioned priorities can be expressed by the following review conditions.

<Review Conditions>

The motion information (reference picture and reference picture list) of a block to be scanned is:

(1) a reference picture identical to that of the current block and a reference picture list identical thereto;

(2) a reference picture identical to that of the current block and a reference picture list different therefrom;

(3) a reference picture different from that of the current block and a reference picture list identical thereto;

(4) a reference picture different from that of the current block and a reference picture list.

Regarding the review conditions, the encoder or the decoder may scan a predetermined number of, for example, n, blocks in a predetermined order so as to determine a spatial motion vector candidate for motion vector prediction. At this time, the encoder or the decoder may determine where a block is a block corresponding to the review conditions while sequentially scanning the n neighboring blocks of the current block or may determine whether a block corresponding to the review conditions in a scanned group while scanning the neighboring blocks of the current block, for example, by the upper group, the left group, and the corner group. Instead of classifying the neighboring blocks into the upper group, the left group, and the corner group, the neighboring blocks of the current block may be classified into the upper group including the left-upper corner block and the upper-right corner block and a left block including the left-lower corner block and it may be determined whether there is a block satisfying the review conditions in the group to be scanned while scanning two groups by groups.

Regarding the review conditions, the encoder or the decoder may give a higher priority to the review condition with a lower number. This is because a neighboring block satisfying the review condition with a lower number may be considered to have motion information more similar to the current block.

Hereinafter, a method of using the motion vector of a block, which is first checked to be available while sequentially scanning n neighboring blocks of the current block on the basis of the priorities of the review conditions, as a motion vector predictor candidate for predicting the motion vector of the current block without any change or by scaling will be described with reference to tables.

Here, an available block means a block which can be used for the inter prediction of the current block.

As described above, the scaling can be carried out in consideration of the temporal distance between the reference picture of the current block and the current picture and the temporal distance between the reference pictures of the neighboring blocks and the current picture.

Numerals of 1 to 12 described in the below tables represents the scanning (checking) order. For the purpose of convenience for explanation, block 0, block 1, and block 2 are considered as the neighboring blocks of the current block. Blocks 0 to 2 represent the positions of candidate blocks for calculating a spatial motion vector candidate. The positions of blocks 0 to 2 are located in any one of the left side, the upper side, and the corners around the current block. For the purpose of convenience for explanation, it may be assumed that blocks 0 to 2 are sequentially located in the scanning order.

Table 13 shows an example of the method of using the motion vector of a block, which is first checked to be available while sequentially scanning blocks 0 to 2 around the current block on the basis of the priorities of the review conditions, as a spatial motion vector predictor candidate of the current block by scaling.

TABLE 13

|  | Block 0 | Block 1 | Block 2 |
|---|---|---|---|
| Review condition 1 | 1 | 2 | 3 |
| Review condition 2 | 4 | 5 | 6 |
| Review condition 3 | 7 | 8 | 9 |
| Review condition 4 | 10 | 11 | 12 |

In the example shown in Table 13, it is checked whether block 0 has motion information satisfying review condition 1, the motion vector (mv) of block 0 is used as a spatial motion vector predictor candidate of the current block when block 0 has motion information satisfying review condition 1, block 1 is searched when block 0 does not have motion information satisfying review condition 1, and it is checked whether block 1 has motion information satisfying review condition 1. In this way, the spatial motion vector predictor candidate of the current block is determined.

Table 14 shows another example of the method of using the motion vector of a block, which is first checked to be available while sequentially scanning blocks 0 to 2 around the current block on the basis of the priorities of the review conditions, as a spatial motion vector predictor candidate of the current block by scaling.

TABLE 14

|  | Block 0 | Block 1 | Block 2 |
|---|---|---|---|
| Review condition 1 | 1 | 5 | 9 |
| Review condition 2 | 2 | 6 | 10 |
| Review condition 3 | 3 | 7 | 11 |
| Review condition 4 | 4 | 8 | 12 |

In the example shown in Table 14, it is checked whether block 0 has motion information satisfying review condition 1, the motion vector (mv) of block 0 is used as a spatial motion vector predictor candidate of the current block when block 0 has motion information satisfying review condition 1, and it is scanned (checked) whether block 0 has motion information satisfying review condition 2. When block 0 does not have motion information satisfying review conditions 1 to 4, it is checked whether block 1 has motion information satisfying review conditions 1 to 4 while scanning block 1 for review conditions 1 to 4. In this way, the spatial motion vector predictor candidate of the current block is determined.

Table 15 shows another example of the method of using the motion vector of a block, which is first checked to be available while sequentially scanning blocks 0 to 2 around the current block on the basis of the priorities of the review conditions, as a spatial motion vector predictor candidate of the current block by scaling.

TABLE 15

|  | Block 0 | Block 1 | Block 2 |
|---|---|---|---|
| Review condition 1 | 1 | 2 | 3 |
| Review condition 2 | 4 | 7 | 10 |
| Review condition 3 | 5 | 8 | 11 |
| Review condition 4 | 6 | 9 | 12 |

In the example shown in Table 15, it is checked whether block 0 has motion information satisfying review condition 1, and the motion vector (mv) of block 0 is used as a spatial motion vector predictor candidate of the current block when block 0 has motion information satisfying review condition 1. When block 0 does not have motion information satisfying review condition 1, it is sequentially checked whether blocks 1 and 2 have motion information satisfying review condition 1. When blocks 0 to 2 do not have motion information satisfying review condition 1, it is sequentially checked whether block 0 has motion information satisfying the corresponding review condition while scanning block 1 for review conditions 2 to 4. When block 0 does not have motion information satisfying review conditions 2 to 4, review conditions 2 to 4 are sequentially checked for block 1. In this way, the spatial motion vector predictor candidate of the current block is determined.

Table 16 shows another example of the method of using the motion vector of a block, which is first checked to be available while sequentially scanning blocks 0 to 2 around the current block on the basis of the priorities of the review conditions, as a spatial motion vector predictor candidate of the current block by scaling.

TABLE 16

|  | Block 0 | Block 1 | Block 2 |
|---|---|---|---|
| Review condition 1 | 1 | 5 | 6 |
| Review condition 2 | 2 | 7 | 8 |
| Review condition 3 | 3 | 9 | 10 |
| Review condition 4 | 4 | 11 | 12 |

In the example shown in Table 16, it is sequentially checked whether block 0 has motion information satisfying review conditions 1 to 4. For example, when block 0 has motion information satisfying review condition 1, the motion vector is used as a spatial motion vector predictor candidate of the current block. When there is no motion information satisfying review condition 1, it is checked whether there is motion information satisfying review condition 2. When block 0 does not have motion information satisfying review conditions 1 to 4, it is sequentially checked whether block 1 and block 2 have motion information satisfying the corresponding review condition while scanning block 1 for review condition 1. When blocks 0 to 2 do not have motion information satisfying review condition 1, it is sequentially checked whether blocks 1 and 2 have motion information satisfying review condition 2. In this way, the spatial motion vector predictor candidate of the current block is determined.

The example shown in Table 13 shows a scanning order with a priority given to the review conditions rather than the positions of the blocks. On the contrary, Table 14 shows an example of a scanning order with a priority given to the positions of the blocks rather than the review conditions.

Table 15 and Table 16 show examples of a scanning order in which the priority of the review conditions and the priority of the positions of the blocks are appropriately mixed. As described above, Table 15 shows an example of a scanning order of considering the positions of the blocks when the highest priority is given to review condition 1 but there is no block satisfying review condition 1. Table 16 shows an example of a scanning order of sequentially considering the conditions when there is no available motion information after reviewing availability of the review conditions in block 0.

The motion vectors (for example, a', b', and c') scaled by the above-mentioned methods can have an influence on the values of median vectors of a', b', and c'. In addition, the motion vectors may have an influence on the number of motion vectors to be considered at the time of determining the candidate motion vectors. For example, motion vectors of neighboring blocks classified into available motion vectors may be newly created by the scaling.

The above-mentioned methods may be used even when the AMVP technique is not directly applied. For example, the motion vector of the current block may be predicted through the processes of calculating the motion vectors a', b', and c' and calculating medians from a', b', and c'.

At this time, the process of calculating a', b', and c' may employ the same method as calculating a', b', and c' in the AMVP.

Figure 9:
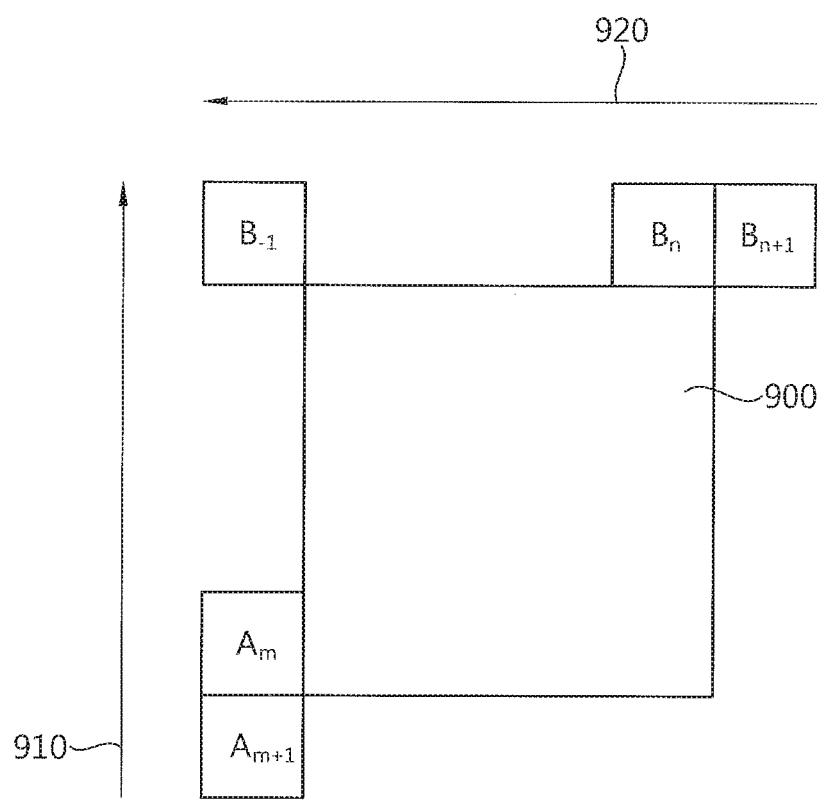
FIG. 9 is a diagram schematically illustrating a method of applying an AMVP according to an embodiment of the invention.

On the other hand, the AMVP method may be modified and applied as shown in FIG. 9.

FIG. 9 is a diagram schematically illustrating another method of applying the AMVP according to an embodiment of the invention. Referring to FIG. 9, a part of the neighboring blocks of the current block shown in FIG. 8 may be used as the motion vector candidates. For example, in the example shown in FIG. 9, a block located at the left-lowermost side of the current block out of m left blocks $A_0$, $A_1$, . . . , and $A_m$ located on the left-lowermost side of a current block 900, a block $A_{m+1}$ located at the left-lower corner of the current block 900, a block $B_{-1}$ located at the left-upper corner of the current block 900, a block $B_n$ located on the upper-rightmost side of the current block out of n upper blocks located on the upper side of the current block 900, and a block $B_{n+1}$ located at the upper-right corner of the current block 900 can be used as AMVP candidate blocks.

In this case, the neighboring blocks $A_m$, $A_{m+1}$, $B_{-1}$, $B_n$, and $B_{n+1}$ of the current block are used, similarly to the example shown in FIG. 4 in which the corner blocks, the left-lower block 420-1, and the upper-right block 440-1 are used. In the example shown in FIG. 9, the left blocks $A_m$ and $A_{m+1}$ are scanned (or checked) in the order 910 of $A_{m+1} \rightarrow A_m$ and the upper blocks $B_{-1}$, $B_n$, and $B_{n+1}$ are scanned (or checked) in the order 920 of $B_{n+1} \rightarrow B_n \rightarrow B_{-1}$.

At this time, motion vectors (motion vector predictors: MVP) expressed by Expression 6 can be considered as motion vector candidates of the current block.

Motion vector candidates=
{a',b',temporal predictor}}    <Expression 6>

Expression 6 shows candidates of the motion vector which can be used as the motion vector predictors of the current block in the example shown in FIG. 9. The encoder or the decoder can create the motion vector predictor candidate list described with reference to FIG. 3 using all or a part of the motion vector candidates of Expression 6.

Referring to Expression 6, the motion vectors of two blocks out of the spatial neighboring blocks of the current block are considered to predict the motion vector of the current block in the example shown in FIG. 9. The encoder or the decoder can consider the motion vectors of two spatial neighboring blocks of the current block expressed by Expression 6 and the motion vector (temporal predictor) of the temporal neighboring block of the current block.

In Expression 6, a' is the motion vector of a block which is first searched for to be available when scanning (checking) the left blocks $A_m$ and $A_{m+1}$ of the current block in the order 910 of $A_{m+1} \rightarrow A_m$ and is the motion vector predictor candidate of the current block.

In Expression 6, b' is the motion vector of a block which is first searched for to be available when scanning (checking) the upper blocks $B_{-1}$, $B_n$, and $B_{n+1}$ of the current block in the order 920 of $B_{n+1} \rightarrow B_n \rightarrow B_{-1}$ and is the motion vector predictor candidate of the current block. b' may be said to be a top mv predictor.

When the reference picture index of the neighboring block selected to be available is identical to the reference picture index of the current block, that is, when the reference picture of the selected neighboring block is identical to the reference picture of the current block, the motion vector of the corresponding block may be used as the motion vector predictor of the current block without scaling the motion vector. This case corresponds to review condition 1 or review condition 2.

When the reference picture index of the neighboring block selected to be available is different from the reference picture index of the current block, that is, when the reference picture of the selected neighboring block is different from the reference picture of the current block, the motion vector of the corresponding block can be used as the motion vector predictor of the current block by scaling the motion vector. This case corresponds to review condition 3 or review condition 4.

In FIG. 9, the motion vectors of the neighboring blocks of the current block can be scanned in various orders in consideration of the four-step review conditions and the positions of the neighboring blocks. At this time, the encoder or the decoder can independently determine the motion vector predictor candidate calculated from the left blocks $A_m$ and $A_{m+1}$, for example, the left motion vector predictor, and the motion vector predictor candidate calculated from the upper blocks $B_{-1}$, $B_n$, and $B_{n+1}$, for example, the upper motion vector predictor.

Similarly to the example shown in FIG. 8, in FIG. 9, it is checked whether the review conditions are satisfied while performing the scanning in the order shown in the below table, the scanning is stopped when a review condition is satisfied, and the motion vector of the block satisfying the review condition is used as a motion vector predictor (MVP) candidate for predicting the motion vector of the current block without any change or by scaling.

The encoder or the decoder can construct a motion vector predictor (MVP) list on the basis of the selected motion vector predictor candidates. The encoder can indicate a motion vector predictor to be used to predict the current block in the MVP list by the use of a motion vector predictor index or the like. The decoder can derive the motion vector of the current block using the motion vector predictor in the motion vector predictor list indicated by the motion vector predictor index received from the encoder.

Hereinafter, the method of selecting a left motion vector predictor and the method of selecting an upper motion vector predictor will be sequentially described. Numerals of 1 to 8 represent the scanning order in the following table.

Table 17 shows an example of the method of using the motion vector of a block, which is first checked to be available while sequentially scanning the left neighboring blocks $A_m$ and $A_{m+1}$ of the current block 900 in FIG. 9 in the priority order of the review conditions, as a spatial motion vector predictor candidate of the current block without any change or by scaling.

TABLE 16

|  | Block $A_m$ | Block $A_{m+1}$ |
|---|---|---|
| Review condition 1 | 1 | 5 |
| Review condition 2 | 2 | 6 |
| Review condition 3 | 3 | 7 |
| Review condition 4 | 4 | 8 |

In the example shown in Table 17, it is checked whether block $A_m$ satisfies one of the review conditions. When block $A_m$ does not satisfy review condition 1, it is checked whether block $A_m$ satisfies review condition 2. The scanning is carried out in this way and it is sequentially checked whether block $A_{m+1}$ satisfies one of review conditions 1 to 4 in the scanning order when block $A_m$ does not satisfy review conditions 1 to 4.

When the corresponding block satisfies a review condition in the course of scanning, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 18 shows another example of the method of using the motion vector of a block, which is first checked to be available while sequentially scanning the left neighboring blocks $A_m$ and $A_{m+1}$ of the current block 900 in FIG. 9 in the priority order of the review conditions, as a spatial motion vector predictor candidate of the current block without any change or by scaling.

TABLE 18

|  | Block $A_m$ | Block $A_{m+1}$ |
|---|---|---|
| Review condition 1 | 1 | 2 |
| Review condition 2 | 3 | 6 |
| Review condition 3 | 4 | 7 |
| Review condition 4 | 5 | 8 |

In the example shown in Table 18, it is checked whether block $A_m$ satisfies review condition 1. When block $A_m$ does not satisfy review condition 1, it is checked whether block $A_{m+1}$ satisfies review condition 1. When block $A_{m+1}$ does not satisfy review condition 1, it is sequentially checked whether block $A_m$ satisfies one of review conditions 2 to 4. When block $A_m$ does not satisfy review conditions 2 to 4, it is sequentially checked whether block $A_{m+1}$ satisfies one of review conditions 2 to 4 in the scanning order.

When the corresponding block satisfies a review condition in the course of scanning, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 19 shows another example of the method of using the motion vector of a block, which is first checked to be available while sequentially scanning the left neighboring blocks $A_m$ and $A_{m+1}$ of the current block 900 in FIG. 9 in the priority order of the review conditions, as a spatial motion vector predictor candidate of the current block without any change or by scaling.

TABLE 19

|  | Block $A_m$ | Block $A_{m+1}$ |
|---|---|---|
| Review condition 1 | 5 | 1 |
| Review condition 2 | 6 | 2 |
| Review condition 3 | 7 | 3 |
| Review condition 4 | 8 | 4 |

In the example shown in Table 19, unlike the scanning order shown in Table 17, it is sequentially checked whether block $A_{m+1}$ satisfies review conditions 1 to 4. When block $A_{m+1}$ does not satisfy review conditions 1 to 4, it is sequentially checked whether block $A_m$ satisfies review conditions 1 to 4.

When a block satisfying a review condition is searched for in the course of scanning, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 20 shows another example of the method of using the motion vector of a block, which is first checked to be available while sequentially scanning the left neighboring blocks $A_m$ and $A_{m+1}$ of the current block 900 in FIG. 9 in the priority order of the review conditions, as a spatial motion vector predictor candidate of the current block without any change or by scaling.

TABLE 20

|  | Block $A_m$ | Block $A_{m+1}$ |
|---|---|---|
| Review condition 1 | 2 | 1 |
| Review condition 2 | 6 | 3 |
| Review condition 3 | 7 | 4 |
| Review condition 4 | 8 | 5 |

In the example shown in Table 20, the scanning order applied in the example of Table 18 is applied with a priority given to block $A_{m+1}$, unlike the example of Table 18. For example, it is checked whether block $A_{m+1}$ satisfies review condition 1 in the example of Table 20. When block $A_{m+1}$ does not satisfy review condition 1, it is checked whether block $A_m$ satisfies review condition 1 in the scanning order. When block A does not satisfy review condition 1, it is sequentially checked whether block $A_{m+1}$ satisfies one of review conditions 2 to 4 in the scanning order. When block $A_{m+1}$ does not satisfy review conditions 2 to 4, it is sequentially checked whether block $A_m$ satisfies one of review conditions 2 to 4 in the scanning order.

When a block satisfying a review condition is searched for in the course of scanning, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 21 shows another example of the method of using the motion vector of a block, which is first checked to be available while sequentially scanning the left neighboring blocks $A_m$ and $A_{m+1}$ of the current block 900 in FIG. 9 in the priority order of the review conditions, as a spatial motion vector predictor candidate of the current block without any change or by scaling.

TABLE 21

|  | Block $A_m$ | Block $A_{m+1}$ |
|---|---|---|
| Review condition 1 | 2 | 1 |
| Review condition 2 | 4 | 3 |
| Review condition 3 | 7 | 5 |
| Review condition 4 | 8 | 6 |

In the example shown in Table 21, it is first checked whether block $A_{m+1}$ satisfies review condition 1. When block $A_{m+1}$ does not satisfy review condition 1, it is checked whether block $A_m$ satisfies review condition 1 in the scanning order. When block $A_m$ does not satisfy review condition 1, it is checked whether block $A_{m+1}$ satisfies review condition 2 in the scanning order. When block $A_{m+1}$ does not satisfy review condition 2, it is checked whether block $A_m$ satisfies review condition 2 in the scanning order. When block $A_m$ does not satisfy review condition 2, it is sequentially checked whether block $A_{m+1}$ satisfies one of review conditions 3 and 4 and whether block $A_m$ satisfies one of review conditions 3 and 4.

When a block satisfying a review condition is searched for in the course of scanning, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 22 shows another example of the method of using the motion vector of a block, which is first checked to be available while sequentially scanning the left neighboring blocks $A_m$ and $A_{m+1}$ of the current block 900 in FIG. 9 in the priority order of the review conditions, as a spatial motion vector predictor candidate of the current block without any change or by scaling.

TABLE 22

|  | Block $A_m$ | Block $A_{m+1}$ |
|---|---|---|
| Review condition 1 | 3 | 1 |
| Review condition 2 | 4 | 2 |
| Review condition 3 | 7 | 5 |
| Review condition 4 | 8 | 6 |

In Table 22, it is sequentially checked whether each block satisfies two review conditions. Specifically, the encoder or the decoder first checks whether block $A_{m+1}$ satisfies review condition 1. When block $A_{m+1}$ does not satisfy review condition 1, the encoder or the decoder checks whether block $A_{m+1}$ satisfies review condition 2. When block $A_{m+1}$ does not satisfy review condition 2, the encoder or the decoder checks whether block $A_m$ satisfies review condition 1. When block $A_m$ does not satisfy review condition 1, the encoder or the decoder checks whether block $A_m$ satisfies review condition 2. When block $A_m$ does not satisfy review condition 2, the encoder or the decoder checks whether block $A_{m+1}$ satisfies review condition 3. When block $A_{m+1}$ does not satisfy review condition 3, the encoder or the decoder checks whether block $A_{m+1}$ satisfies review condition 4. When block $A_{m+1}$ does not satisfies review condition 4, the encoder or the decoder checks whether block $A_m$ satisfies review condition 3. When block $A_m$ does not satisfies review condition 3, the encoder or the decoder checks whether block $A_m$ satisfies review condition 4.

When a block satisfying a review condition is searched for in the course of scanning, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

As in the examples of Tables 17 to 22, various scanning orders can be applied to calculate the motion vector predictor candidate of the current block from the left neighboring blocks $A_m$ and $A_{m+1}$ of the current block, that is, the left motion vector candidate (left my candidate).

At this time, some scanning may be omitted or removed to reduce the number of cases in which the scanning is carried out and to acquire a gain in complexity. For example, in the example of Table 17, the scanning is carried out only in the order of 1 to 5 and the scanning corresponding to the order of 6 to 8 may be omitted. Similarly, in the examples of Tables 18 to 22, the scanning with posterior priorities (for example, such as the order of 5 to 8, the order of 6 to 8, and the order of 7 to 8 or 8) may be omitted to reduce the complexity of the processes.

It may be possible to acquire a gain in complexity by performing the procedure for checking whether a block satisfies the review condition by review conditions. For example, in Table 22, two review conditions are sequentially checked for each block.

In the examples of Table 21 and Table 22, priority is given to review condition 1 and review condition 2. As described above, since the block corresponding to review condition 1 and review condition 2 has a reference picture identical to that of the current block, the motion vector of the corresponding block can be used as the motion vector predictor candidate of the current block without scaling. Therefore, it is possible to reduce the scaling frequency and the complexity.

Hereinafter, the method of selecting a motion vector predictor candidate from the upper neighboring blocks $B_{-1}$, $B_n$, and $B_{n+1}$ of the current block, that is, the upper motion vector predictor, will be described. The method of selecting the motion vector predictor candidate of the current block from the upper neighboring blocks is basically the same as the method of selecting the motion vector predictor candidate of the current block from the left neighboring blocks, except that there are three blocks to be scanned. Numerals of 1 to 12 in the following tables represent the scanning order.

Table 23 shows an example of the method of using the motion vector of a block, which is first checked to be available while sequentially scanning the upper neighboring blocks $B_{-1}$, $B_n$, and $B_{n+1}$ of the current block 900 in FIG. 9 in the priority order of the review conditions, as a spatial motion vector predictor candidate of the current block without any change or by scaling.

TABLE 23

|  | Block $B_{n+1}$ | Block $B_n$ | Block $B_{-1}$ |
|---|---|---|---|
| Review condition 1 | 1 | 5 | 9 |
| Review condition 2 | 2 | 6 | 10 |
| Review condition 3 | 3 | 7 | 11 |
| Review condition 4 | 4 | 8 | 12 |

In the example shown in Table 23, it is checked whether block $B_{n+1}$ satisfies one of the review conditions. When block $B_{n+1}$ does not satisfy review condition 1, it is checked whether block $B_{n+1}$ satisfies review condition 2. By performing the scanning in this way, when block $B_{n+1}$ does not satisfy review conditions 1 to 4, it is sequentially checked whether block $B_n$ satisfies one of review conditions 1 to 4. When block $B_n$ does not satisfy review conditions 1 to 4, it is sequentially checked whether block $B_{-1}$ satisfies one of review conditions 1 to 4.

When a block satisfies a review condition in the course of scanning, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 24 shows an example of the method of using the motion vector of a block, which is first checked to be available while sequentially scanning the upper neighboring blocks $B_{-1}$, $B_n$, and $B_{n+1}$ of the current block 900 in FIG. 9 in the priority order of the review conditions, as a spatial motion vector predictor candidate of the current block without any change or by scaling.

TABLE 24

|  | Block $B_{n+1}$ | Block $B_n$ | Block $B_{-1}$ |
|---|---|---|---|
| Review condition 1 | 1 | 2 | 3 |
| Review condition 2 | 4 | 5 | 6 |
| Review condition 3 | 7 | 8 | 9 |
| Review condition 4 | 10 | 11 | 12 |

In the example shown in Table 24, it is checked whether block $B_{n+1}$ satisfies review condition 1. When block $B_{n+1}$ does not satisfy review condition 1, it is checked whether block $B_n$ satisfies review condition 1. When block $B_n$ does not satisfy review condition 1, it is checked whether block $B_{-1}$ satisfies review condition 1. When block $B_{-1}$ does not satisfy review condition 1, it is sequentially checked whether blocks satisfy review condition 2 in the order of from $B_{n+1}$ to $B_{-1}$. When blocks do not satisfy review condition 2, it is sequentially checked whether a block satisfying one of review conditions 1 to 4 is present in blocks $B_{N+1}$, $B_n$, $B_{-1}$ in the scanning order in this way.

When a block satisfying a review condition in the course of scanning is searched for, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 25 shows an example of the method of using the motion vector of a block, which is first checked to be available while sequentially scanning the upper neighboring blocks $B_{-1}$, $B_n$, and $B_{n+1}$ of the current block 900 in FIG. 9 in the priority order of the review conditions, as a spatial motion vector predictor candidate of the current block without any change or by scaling.

TABLE 25

|  | Block $B_{n+1}$ | Block $B_n$ | Block $B_{-1}$ |
|---|---|---|---|
| Review condition 1 | 1 | 2 | 3 |
| Review condition 2 | 4 | 7 | 10 |
| Review condition 3 | 5 | 8 | 11 |
| Review condition 4 | 6 | 9 | 12 |

In the example shown in Table 25, it is checked whether blocks satisfy review condition 1 in the order of $B_{n+1}$, $B_n$, $B_{-1}$. When there is no upper neighboring block satisfying review condition 1, it is sequentially checked whether block $B_{n+1}$ satisfies review conditions 2 to 4. When block $B_{n+1}$ does not satisfy review conditions 2 to 4, it is sequentially checked whether block $B_n$ satisfies one of review conditions 2 to 4. When block $B_n$ does not satisfy review conditions 2 to 4, it is sequentially checked whether block $B_{-1}$ satisfies one of review conditions 2 to 4.

When a block satisfying a review condition in the course of scanning is searched for, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 26 shows an example of the method of using the motion vector of a block, which is first checked to be available while sequentially scanning the upper neighboring blocks $B_{-1}$, $B_n$, and $B_{n+1}$ of the current block 900 in FIG. 9 in the priority order of the review conditions, as a spatial motion vector predictor candidate of the current block without any change or by scaling.

TABLE 26

|  | Block $B_{n+1}$ | Block $B_n$ | Block $B_{-1}$ |
|---|---|---|---|
| Review condition 1 | 1 | 2 | 3 |
| Review condition 2 | 4 | 5 | 6 |
| Review condition 3 | 7 | 9 | 11 |
| Review condition 4 | 8 | 10 | 12 |

In the example shown in Table 26, unlike the example of Table 25, it is sequentially checked whether blocks $B_{n+1}$, $B_n$, and $B_{-1}$ satisfy the respective review conditions and it is sequentially checked whether each block satisfies review conditions 3 and 3. For example, it is checked whether review condition 1 is satisfied in the order of $B_{n+1}$, $B_n$, and $B_{-1}$. When there is no upper neighboring block satisfying review condition 1, it is checked whether review condition 2 is satisfied in the order of $B_{n+1}$, $B_n$, and $B_{-1}$. When there is no upper block satisfying one of review conditions 1 and 2, it is sequentially checked whether block $B_{n+1}$ satisfies one of review conditions 3 and 4. When block $B_{n+1}$ does not satisfy review conditions 3 and 4, it is sequentially checked whether block $B_n$ satisfies one of review conditions 3 and 4. When block $B_n$ does not satisfy review conditions 2 to 4, it is sequentially checked whether block $B_{-1}$ satisfies one of review conditions 3 and 4.

When a block satisfying a review condition in the course of scanning is searched for, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

Table 27 shows an example of the method of using the motion vector of a block, which is first checked to be available while sequentially scanning the upper neighboring blocks $B_{-1}$, $B_n$, and $B_{n+1}$ of the current block 900 in FIG. 9 in the priority order of the review conditions, as a spatial motion vector predictor candidate of the current block without any change or by scaling.

TABLE 27

|  | Block $B_{n+1}$ | Block $B_n$ | Block $B_{-1}$ |
|---|---|---|---|
| Review condition 1 | 1 | 3 | 5 |
| Review condition 2 | 2 | 4 | 6 |
| Review condition 3 | 7 | 9 | 11 |
| Review condition 4 | 8 | 10 | 12 |

In the example shown in Table 27, similarly to the example of Table 22, it is checked whether each block satisfies two review conditions. Specifically, the encoder or the decoder sequentially checks whether block $B_{n+1}$ satisfies one of review conditions 1 and 2. When block $B_{n+1}$ does not satisfy review conditions 1 and 2, it is sequentially checked whether block $B_n$ satisfies one of review conditions 1 and 2. When block $B_n$ does not satisfy review conditions 1 and 2, it is sequentially checked whether block $B_{-1}$ satisfies one of review conditions 1 and 2. When the upper blocks do not satisfy review conditions 1 and 2, it is sequentially checked whether block $B_{n+1}$ satisfies one of review conditions 3 and 4. When block $B_{n+1}$ does not satisfy review conditions 3 and 4, it is sequentially checked whether block $B_n$ satisfies one of review conditions 3 and 4. When block $B_n$ does not satisfy review conditions 3 and 4, it is sequentially checked whether block $B_{-1}$ satisfies one of review conditions 3 and 4.

When a block satisfying a review condition in the course of scanning is searched for, the encoder or the decoder stops the scanning and selects the motion vector of the corresponding block as the motion vector predictor candidate of the current block. The encoder or the decoder may scale the motion vector of the neighboring block and may use the scaled motion vector as the motion vector predictor candidate, if necessary. For example, when the reference picture of the neighboring block is different from the reference picture of the current block, the encoder or the decoder may scale the motion vector of the corresponding neighboring block and may use the scaled motion vector as the motion vector predictor candidate. At this time, the method expressed by Expression 1 or Expression 2 may be used as the scaling method.

As can be seen from Tables 23 to 27, similarly to calculating the motion vector predictor candidate of the current block from the left blocks of the current block, various scanning orders can be applied to calculate the motion vector predictor candidate of the current block from the upper blocks of the current block.

In the method of calculating the motion vector predictor candidate of the current block from the top blocks, that is, the top motion vector candidate, the number of cases of carrying out the scanning may be reduced so as to reduce complexity. For example, the scanning may be carried out only in the scanning of checking whether review condition 1 is satisfied or the scanning for performing a first scanning operation for each review condition. In this case, the scanning in the order of 6, 78, 10, 11, and 12 in the example shown in FIG. 23 may be omitted.

The examples of Tables 26 and 27 show the methods of giving the priority to review conditions 1 and 2, similarly to the examples of Tables 21 and 22. Since the block corresponding to review conditions 1 and 2 refers to a reference picture identical to that of the current block (for example, a current prediction unit), the motion vector thereof may be used as the motion vector predictor candidate of the current block without scaling. Therefore, it is possible to reduce complexity in scaling a motion vector.

On the other hand, various combinations of review conditions, various orders of the review conditions, and the order of the block positions may be applied in addition to the above-mentioned scanning method. The above-mentioned scanning methods may be applied in combination.

In this description, the term, "motion vector predictor", is used, but this is for convenience for explanation, and the motion vector predictor may be called a predicted motion vector (PMV) or the like.

In FIGS. 4, 5, 7, 8, and 9, the current block and the neighboring blocks of the current block may be prediction units. In FIGS. 4, 5, 7, 8, and 9, the current block and the neighboring blocks of the current block may be coding units. In addition, in FIGS. 4, 5, 7, 8, and 9, the current block and the neighboring blocks of the current block may be transform units. Therefore, the details described with reference to FIGS. 4, 5, 7, 8, and 9 may be similarly applied to the cases where the current block and the neighboring blocks of the current block are coding units or transform units.

On the other hand, this description describes that the processes of selecting a motion vector predictor candidate and performing prediction on the current block using the selected motion vector predictor candidate are carried out by the encoder or the decoder, but this is for convenience for explanation and the invention is not limited to this configuration. The processes of selecting a motion vector predictor candidate and performing prediction on the current block using the selected motion vector predictor candidate may be carried out by a predetermined module or unit in the encoder or the decoder. For example, the processes of selecting a motion vector predictor candidate and performing prediction on the current block using the selected motion vector predictor candidate are carried out by the encoder or the decoder may be carried out by the prediction module in the encoder or the decoder.

Figure 10:
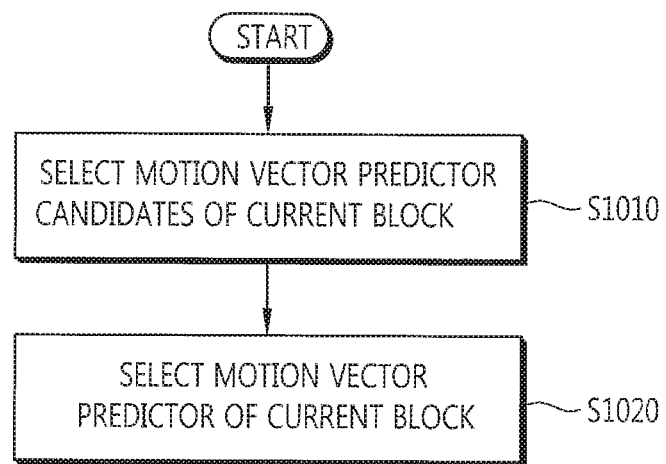
FIG. 10 is a flowchart schematically illustrating a method of selecting a motion vector predictor of a current block according to an embodiment of the invention.

FIG. 10 is a flowchart schematically illustrating a method of selecting a motion vector predictor of the current block according to the invention. The steps shown in FIG. 10 may be performed by the encoder or the decoder. The prediction module of the encoder or the decoder may carry out the steps shown in FIG. 10. Here, for the purpose of convenience for explanation, it is assumed that the prediction unit in the encoder or the decoder carries out the steps shown in FIG. 10.

Referring to FIG. 10, the prediction module selects motion vector predictor candidates of the current block (S1010). The prediction module may select the motion vector of a first block searched to be available out of the neighboring blocks of the current block as the motion vector predictor candidate of the current block. At this time, the prediction module may perform a search process after classifying the neighboring blocks of the current block into predetermined groups, and may select the motion vector predictor candidate of the current block for each group.

At this time, the available block may be a block to be encoded/decoded in the inter prediction mode and may be a block satisfying the above-mentioned review conditions. The methods of classifying the neighboring blocks of the current block are as described above.

The prediction module may scale the motion vector of the first block searched for to be available and may select the scaled motion vector as the motion vector predictor candidate of the current block. For example, the prediction module may scale the motion vector of the corresponding block when the first block searched for to be available satisfies review condition 3 or 4. The specific scaling method is as described above.

The prediction module may acquire motion vector predictor candidates from temporal neighboring blocks when the number of motion vector predictor candidates which can be acquired from the spatial neighboring blocks is less than a predetermined number.

The prediction module selects a motion vector predictor of the current block out of the motion vector predictor candidates (S1020). The prediction module constructs a motion vector predictor list using the selected motion vector predictor candidates. The prediction module of the encoder selects a motion vector predictor, which minimizes the amount of data to be transmitted, from the motion vector predictor list. The prediction module of the decoder selects a motion vector predictor, which is indicated by the motion vector predictor information (for example, motion vector predictor index) transmitted from the encoder, from the motion vector predictor list and perform prediction on the current block.

While the methods in the above-mentioned exemplary system have been described on the basis of a series of steps or flowcharts, the invention is not limited to the order of the steps and a certain step may be performed in an order other than described above or at the same time as described above. The above-mentioned embodiments includes various examples.

Therefore, the invention includes embodiments in which the above-mentioned embodiments are simultaneously applied or combined.

The invention claimed is:

1. A video encoding apparatus, comprising:
a predictor configured to derive a first motion vector predictor (MVP) candidate of the current block from a first neighboring block group including a lower left neighboring block and a left neighboring block, to derive a second MVP candidate of the current block from a second neighboring block group including an upper right neighboring block, an upper neighboring block, and an upper left neighboring block, to select MVP of the current block from an MVP candidate list constructed based on the first MVP candidate and the second MVP candidate, and to determine a motion vector difference (MVD) based on the selected MVP; and
an entropy encoder configured to encode information on the MVD to generate a bitstream including the encoded information;
wherein the first MVP candidate is derived based on a motion vector of the lower left neighboring block or the left neighboring block which satisfying a first condition or a second condition,
wherein the second MVP candidate is derived based on a motion vector of the upper right neighboring block, the upper neighboring block, or the upper left neighboring block which satisfying the first condition or the second condition,
wherein the first condition is whether a block in the first neighboring block group or the second neighboring block group has a reference picture and a reference picture list identical to a reference picture and a reference picture list of the current block, and
wherein the second condition is whether a block in the first neighboring block group or the second neighboring block group has a reference picture identical to the reference picture of the current block and has a reference picture list different from the reference picture list of the current block.

2. The apparatus of claim 1, wherein the first MVP candidate is derived based on a first search order, wherein the first search order is determined as in order of the lower left neighboring block and the left neighboring block,
wherein the second MVP candidate is derived based on a second search order, wherein the second search order is determined as in order of the upper right neighboring block, the upper neighboring block and the upper left neighboring block.

3. The apparatus of claim 2, wherein in deriving the first MVP candidate, when the lower left neighboring block is determined as not satisfying the first condition and the second condition, whether the left neighboring block satisfies the first condition or the second condition is checked, and
wherein in deriving the second MVP candidate, when the upper right neighboring block is determined as not satisfying the first condition and the second condition, whether the upper neighboring block satisfies the first condition or the second condition is checked.

4. The apparatus of claim 3, wherein in deriving the second MVP candidate, when the upper neighboring block is determined as not satisfying the first condition and the second condition, whether the upper left neighboring block satisfies the first condition or the second condition is checked.

5. The apparatus of claim 1, wherein the first MVP candidate is derived based on a motion vector of the lower left neighboring block or the left neighboring block which satisfying the first condition, the second condition or a third condition;
wherein the second MVP candidate is derived based on a motion vector of the upper right neighboring block, the upper neighboring block, or the upper left neighboring block which satisfying the first condition, the second condition or the third condition,
wherein the third condition is whether a block in the first neighboring block group or the second neighboring block group has a reference picture different from the reference picture of the current block.

6. The apparatus of claim 5, wherein in deriving the first MVP candidate, when the lower left neighboring block and the left neighboring block are determined as not satisfying the first condition and the second condition, whether the lower left neighboring block satisfies the third condition is checked, and
wherein in deriving the second MVP candidate, when the upper right neighboring block, the upper neighboring block and the upper left neighboring block are determined as not satisfying the first condition and the second condition, whether the upper right neighboring block satisfies the third condition is checked.

7. The method of claim 6, wherein scaling is carried out to the motion vector of the lower left neighboring block or the left neighboring block satisfying the third condition based on a distance between a current picture to which the current block belongs and a reference picture of the current block and a distance between the current picture and a reference picture of the lower left neighboring block or the left neighboring block satisfying the third condition.

8. A video decoding method, comprising:
receiving, by a decoding apparatus, information on a motion vector difference (MVD) for a current block;
deriving, by the decoding apparatus, a first motion vector predictor (MVP) candidate of the current block from a first neighboring block group including a lower left neighboring block and a left neighboring block;
deriving, by the decoding apparatus, a second MVP candidate of the current block from a second neighboring block group including an upper right neighboring block, an upper neighboring block, and an upper left neighboring block;
selecting, by the decoding apparatus, an MVP of the current block from an MVP candidate list constructed based on the first MVP candidate and the second MVP candidate;
deriving, by the decoding apparatus, the MVD for the current block based on the information on the MVD;
determining, by the decoding apparatus, a motion vector of the current block based on the selected MVP and the derived MVD;
generating, by the decoding apparatus, a prediction sample of the current block based on the determined motion vector; and
reconstructing, by the decoding apparatus, a current picture based on the generated prediction sample,
wherein the first MVP candidate is derived based on a motion vector of the lower left neighboring block or the left neighboring block which satisfying a first condition or a second condition,
wherein the second MVP candidate is derived based on a motion vector of the upper right neighboring block, the upper neighboring block, or the upper left neighboring block which satisfying the first condition or the second condition, wherein the first condition is whether a block in the first neighboring block group or the second neighboring block group has a reference picture and a reference picture list identical to a reference picture and a reference picture list of the current block, and wherein the second condition is whether a block in the first neighboring block group or the second neighboring block group has a reference picture identical to the reference picture of the current block and has a reference picture list different from the reference picture list of the current block.

9. The method of claim 8, wherein the first MVP candidate is derived based on a first search order, wherein the first search order is determined as in order of the lower left neighboring block and the left neighboring block, wherein the second MVP candidate is derived based on a second search order, wherein the second search order is determined as in order of the upper right neighboring block, the upper neighboring block and the upper left neighboring block.

10. The method of claim 9, wherein in deriving the first MVP candidate, when the lower left neighboring block is determined as not satisfying the first condition and the second condition, whether the left neighboring block satisfies the first condition or the second condition is checked, and wherein in deriving the second MVP candidate, when the upper right neighboring block is determined as not satisfying the first condition and the second condition, whether the upper neighboring block satisfies the first condition or the second condition is checked.

11. The method of claim 10, wherein in deriving the second MVP candidate, when the upper neighboring block is determined as not satisfying the first condition and the second condition, whether the upper left neighboring block satisfies the first condition or the second condition is checked.

12. The method of claim 8, wherein the first MVP candidate is derived based on a motion vector of the lower left neighboring block or the left neighboring block which satisfying the first condition, the second condition or a third condition;

wherein the second MVP candidate is derived based on a motion vector of the upper right neighboring block, the upper neighboring block, or the upper left neighboring block which satisfying the first condition, the second condition or the third condition, wherein the third condition is whether a block in the first neighboring block group or the second neighboring block group has a reference picture different from the reference picture of the current block.

13. The method of claim 12, wherein in deriving the first MVP candidate, when the lower left neighboring block and the left neighboring block are determined as not satisfying the first condition and the second condition, whether the lower left neighboring block satisfies the third condition is checked, and wherein in deriving the second MVP candidate, when the upper right neighboring block, the upper neighboring block and the upper left neighboring block are determined as not satisfying the first condition and the second condition, whether the upper right neighboring block satisfies the third condition is checked.

14. A non-transitory computer-readable storage medium storing video information, the video information, when executed, causing a video decoding apparatus to perform the following steps:

receiving information on a motion vector difference (MVD) for a current block;

deriving a first motion vector predictor (MVP) candidate of the current block from a first neighboring block group including a lower left neighboring block and a left neighboring block;

deriving a second MVP candidate of the current block from a second neighboring block group including an upper right neighboring block, an upper neighboring block, and an upper left neighboring block;

selecting an MVP of the current block from an MVP candidate list constructed based on the first MVP candidate and the second MVP candidate;

deriving the MVD for the current block based on the information on the MVD;

determining a motion vector of the current block based on the selected MVP and the derived MVD;

generating a prediction sample of the current block based on the determined motion vector; and reconstructing a current picture based on the generated prediction sample, wherein the first MVP candidate is derived based on a motion vector of the lower left neighboring block or the left neighboring block which satisfying a first condition or a second condition, wherein the second MVP candidate is derived based on a motion vector of the upper right neighboring block, the upper neighboring block, or the upper left neighboring block which satisfying the first condition or the second condition, wherein the first condition is whether a block in the first neighboring block group or the second neighboring block group has a reference picture and a reference picture list identical to a reference picture and a reference picture list of the current block, and wherein the second condition is whether a block in the first neighboring block group or the second neighboring block group has a reference picture identical to the reference picture of the current block and has a reference picture list different from the reference picture list of the current block.

* * * * *